(12) United States Patent
Tagashira et al.

(10) Patent No.: US 9,757,991 B2
(45) Date of Patent: Sep. 12, 2017

(54) PNEUMATIC TIRE

(71) Applicant: Sumitomo Rubber Industries, Ltd., Kobe-shi, Hyogo (JP)

(72) Inventors: Masao Tagashira, Kobe (JP); Hiroyuki Nakayama, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 567 days.

(21) Appl. No.: 14/170,743

(22) Filed: Feb. 3, 2014

(65) Prior Publication Data

US 2014/0230983 A1    Aug. 21, 2014

(30) Foreign Application Priority Data

Feb. 19, 2013  (JP) ................................ 2013-030360
May 14, 2013  (JP) ................................ 2013-102442
Jun. 3, 2013   (JP) ................................ 2013-117159
Jun. 3, 2013   (JP) ................................ 2013-117160

(51) Int. Cl.
  *B60C 11/03*    (2006.01)
  *B60C 11/12*    (2006.01)

(52) U.S. Cl.
  CPC ........ *B60C 11/1259* (2013.01); *B60C 11/033* (2013.04); *B60C 11/0304* (2013.04); *B60C 11/0306* (2013.04); *B60C 2011/0346* (2013.04); *B60C 2011/0348* (2013.04); *B60C 2011/0353* (2013.04); *B60C 2011/0355* (2013.04); *B60C 2011/0383* (2013.04);
  (Continued)

(58) Field of Classification Search
  CPC ............... B60C 11/0306; B60C 11/033; B60C 2011/0346; B60C 2011/0381; B60C 2011/0383; B60C 2011/0388
  See application file for complete search history.

(56) References Cited

U.S. PATENT DOCUMENTS 5,031,680 A * 7/1991 Kajikawa ................ B60C 11/11
                                              152/209.18
2009/0229721 A1   9/2009 Ikeda
(Continued)

FOREIGN PATENT DOCUMENTS

EP    2 202 096 A2    6/2010
GB    2021494 A    * 12/1979
(Continued)

OTHER PUBLICATIONS

Machine translation for Japan 2006-176055 (no date).*

*Primary Examiner* — Steven D Maki
(74) *Attorney, Agent, or Firm* — Birch, Stewart, Kolasch & Birch, LLP

(57) ABSTRACT

A pneumatic tire is provided in the tread portion with a central land portion between two crown main grooves. The central land portion is provided with notches each having a depth of 55% to 65% of the depth of the crown main groove and having a closed end and an open end opening to the crown main groove.
The maximum axial length of the central notch is 10% to 15% of the maximum axial length of the central land portion, and the circumferential length of the opening is 10% to 15% of one circumferential pitch of the shoulder block row 7R.
The circumferential length of the opening is 15% to 25% of one circumferential pitch of the central notches.

13 Claims, 9 Drawing Sheets

(52) U.S. Cl.
CPC ............ *B60C 2011/0388* (2013.04); *B60C 2011/1209* (2013.04); *B60C 2011/1213* (2013.04)

(56) References Cited

U.S. PATENT DOCUMENTS

| | | | |
|---|---|---|---|
| 2014/0137999 A1* | 5/2014 | Nishiwaki ........... | B60C 11/0309 152/209.8 |
| 2014/0209225 A1* | 7/2014 | Kuroda ............... | B60C 11/0306 152/209.18 |
| 2014/0230979 A1* | 8/2014 | Matsuda ............... | B60C 11/12 152/209.18 |

FOREIGN PATENT DOCUMENTS

| | | | |
|---|---|---|---|
| JP | 2006-176055 A | * | 7/2006 |
| JP | 2009-214775 A | | 9/2009 |
| JP | 2010-149599 A | | 7/2010 |

\* cited by examiner

PNEUMATIC TIRE

BACKGROUND OF THE INVENTION

The present invention relates to a pneumatic tire, more particularly to a tread pattern capable of improving running performance on icy roads, drainage performance on wet roads and uneven wear resistance in a good balance.

Winter tires or pneumatic tires for the winter season are required to have running performance on icy roads and drainage performance on wet roads which are improved in a good balance at high levels.

For example, in the following patent documents, it is proposed to increase the widths of tread grooves such as circumferential grooves and axial grooves in order to improve drainage performance on wet roads.

In such technique, however, as the land portions are decreased in the ground contacting area, frictional force and pattern rigidity are decreased, and running performance on icy roads and uneven wear resistance are liable to deteriorate.

Patent document 1: JP-A-2010-149599
Patent document 2: JP-A-2009-214775

SUMMARY OF THE INVENTION

It is therefore, an object of the present invention to provide a pneumatic tire, in which, by providing a specific configuration for notch which are formed in a central land portion to extend from a crown main groove, running performance on icy roads, uneven wear resistance and drainage performance on wet roads are improved in a good balance.

According to the present invention, a pneumatic tire comprises: a tread portion provided with a crown main groove extending continuously in the tire a circumferential direction and disposed on each side the tire equator, a shoulder main groove extending continuously in the tire a circumferential direction and disposed axially outside each said crown main groove, a plurality of middle axial grooves extending between said crown main groove and said shoulder main groove, and a plurality of shoulder axial grooves extending between said shoulder main groove and the tread edge so that the tread portion is divided into a row of circumferentially arranged shoulder blocks formed between said shoulder main groove and said tread edge, a row of circumferentially arranged middle blocks formed between said crown main groove and said shoulder main groove, and a central land portion formed between the two crown main grooves and provided with central notches, said central notches extending from said crown main groove toward the tire equator, terminating within the central land portion, arranged circumferentially of the tire at intervals, and having a depth smaller than the depth of the crown main groove, wherein the depth of each said central notch is 55% to 65% of the depth of the crown main groove, said central notches satisfy the following condition (A) or (B):

(A) the maximum axial length of each said central notch is 10% to 15% of the maximum axial length of the central land portion, and the circumferential length of an opening of each said central notch to the crown main groove is 10% to 15% of one pitch of the shoulder block row;

(B) the circumferential length of an opening of each said central notch to the crown main groove is 15% to 25% of one pitch of the central notches, Therefore, the central notches increase the axial component and the circumferential component of the edges existing in the tread portion, while maintaining the rigidity of the central land portion. Further, the central notches expedite drainage of water existing between the central land portion and the road surface. As a result, running performance on icy roads, uneven wear resistance and drainage can be improved in a good balance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch of the tire (camber angle=0) in the normally inflated loaded condition.

The tread width TW is the axial distance between the tread edges measured in the normally inflated unloaded condition of the tire.

DESCRIPTION OF THE PREFERRED EMBODIMENTS

Figure 1:
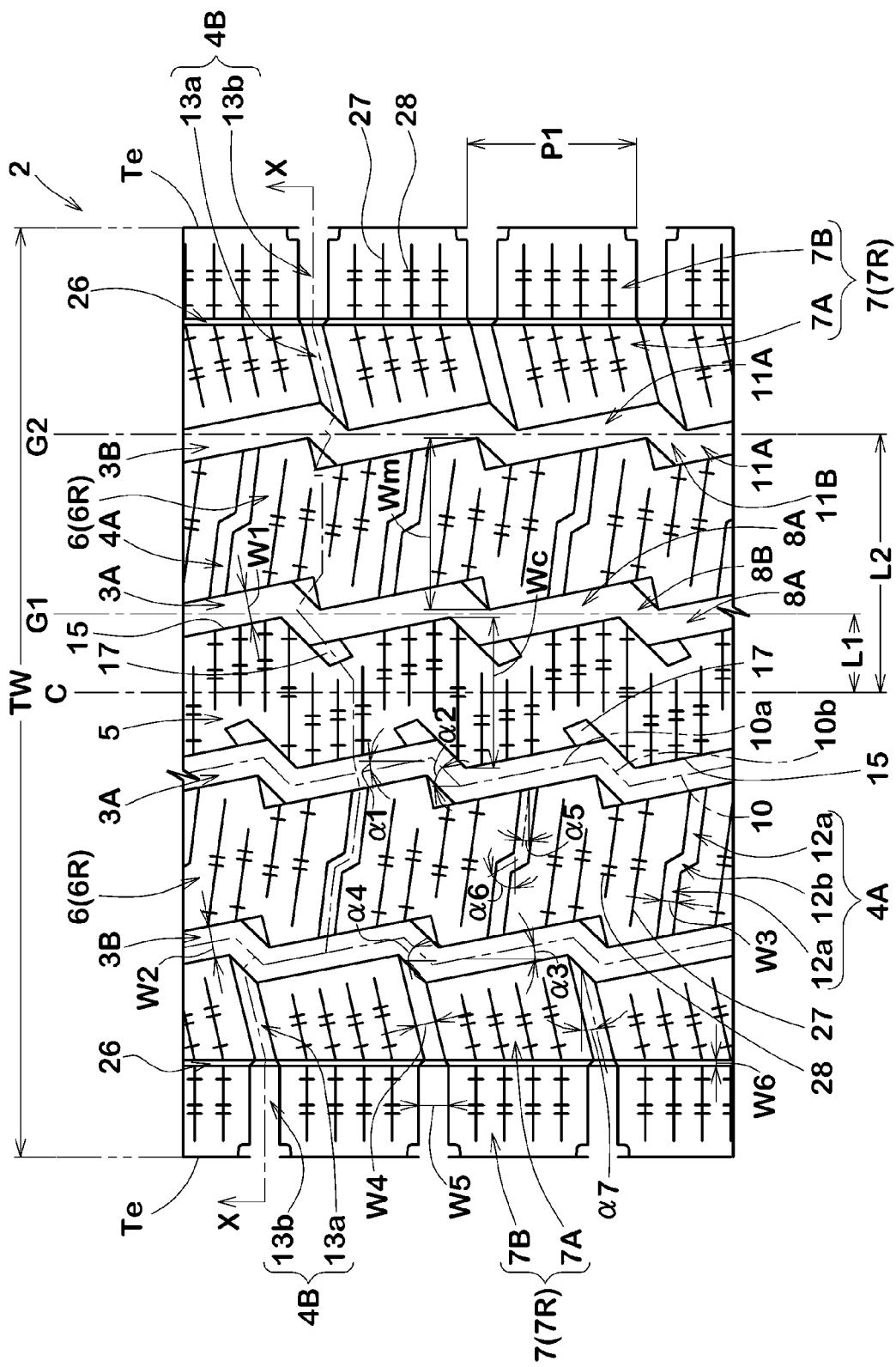
FIG. 1 is a developed partial view of the tread portion of a pneumatic tire as a first embodiment of the present invention.

Embodiments of the present invention will now be described in detail in conjunction with the accompanying drawings.

Pneumatic tires according to the present invention are designed for use in the winter season.

In the drawings, the pneumatic tire comprises, as usual, a tread portion 2, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion.

The tread portion 2 is provided with circumferentially continuously extending main grooves which are a pair of crown main grooves 3A one disposed on each side of the tire equator C and a pair of shoulder main grooves 3B respectively disposed axially outside the crown main grooves 3A.

Further, the tread portion 2 is provided with axial grooves which are middle axial grooves 4A extending from the crown main grooves 3A to the shoulder main grooves 3B, and shoulder axial grooves 4B extending from the shoulder main grooves 3B to the tread edges Te.

The tread portion 2 is, accordingly, provided with a tread pattern formed by
a central land portion 5 between the two crown main grooves 3A, two rows 6R of circumferentially arranged middle blocks 6 divided by the crown main groove 3A, the shoulder main grooves 3B and the middle axial grooves 4A, and
two rows 7R of circumferentially arranged shoulder blocks 7 divided by the shoulder main grooves 3B, the tread edges Te and the shoulder axial grooves 4B.

The tread pattern is symmetrical about any point on the tire equator C if disorder due to a variable pitching method employed in the groove arrangement to improve noise performance is not taken into consideration.

First Embodiment

Figure 3:
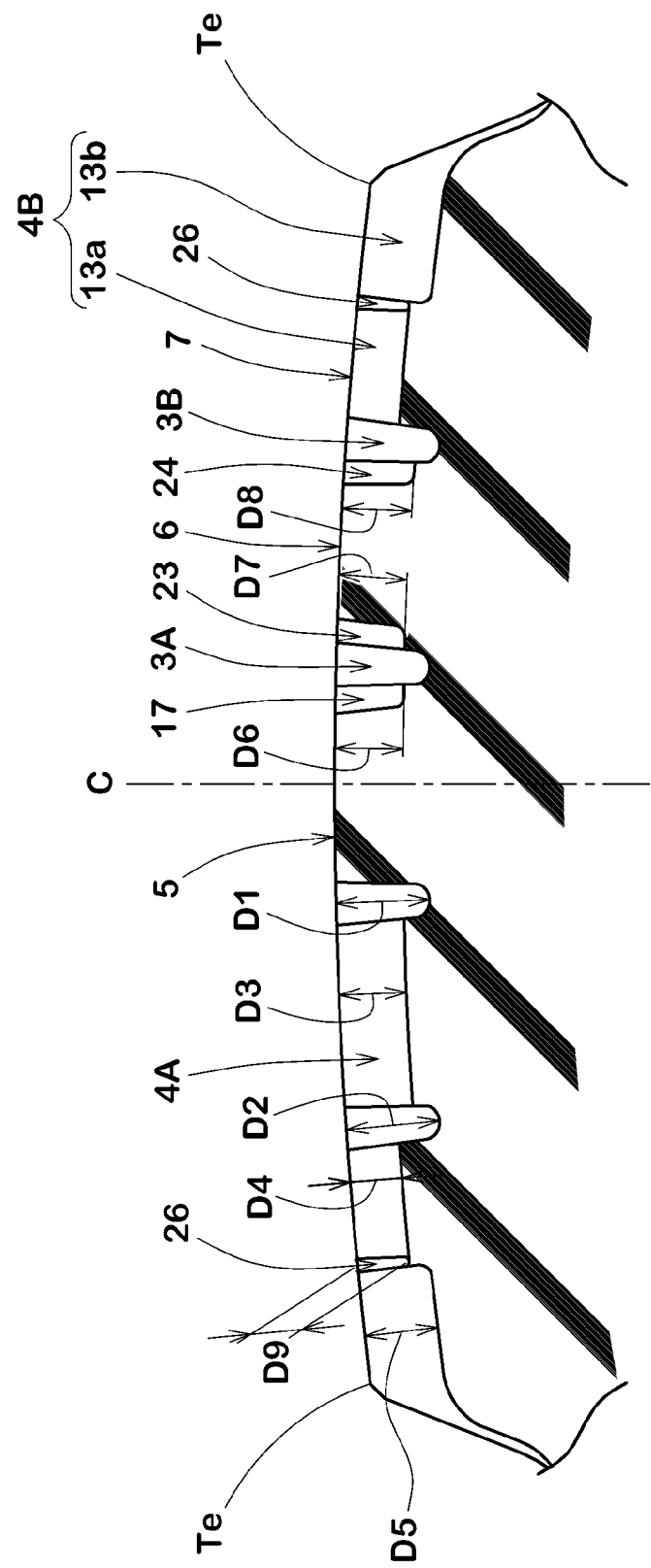
FIG. 3 is a cross sectional view of the tread portion taken along line x-x in FIG. 1.
Figure 4:
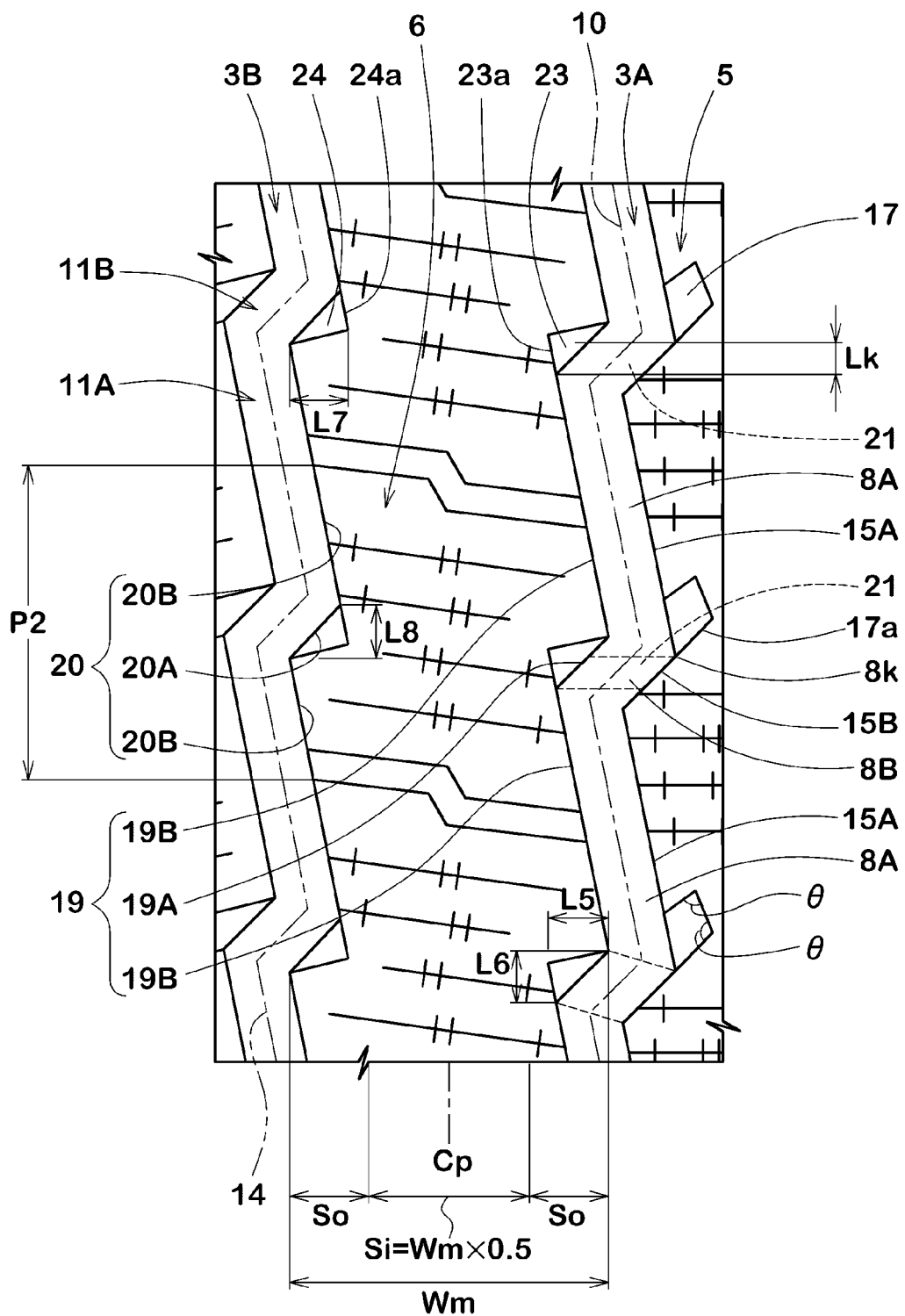
FIG. 4 is a top view of the middle block in the tread portion shown in FIG. 2.
Figure 5:
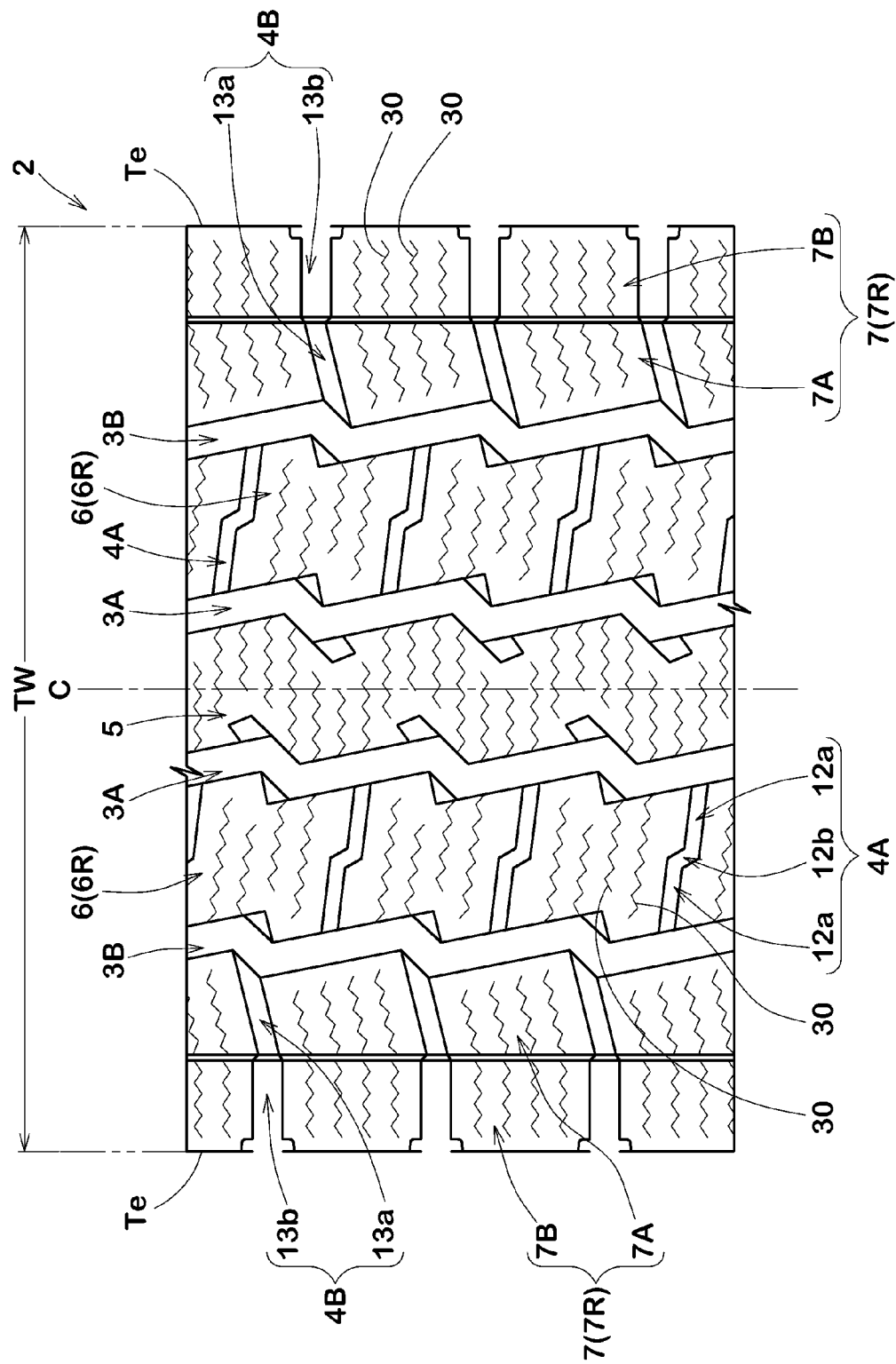
FIG. 5 shows a modification of the tread portion shown in FIG. 1, wherein configurations of sipes are changed otherwise the tread pattern is the same as that shown in FIG. 1.

FIGS. 1-4 show a first embodiment of the present invention, and FIG. 5 shows a modification thereof.

In the first embodiment, the crown main grooves 3A are a zigzag groove made up of long groove segments 8A and short groove segments 8B which are arranged alternately in the tire circumferential direction. Since the edges of such crown main groove 3A include an axial component, the drive power and braking force become increased, and accordingly, running performance on icy roads can be improved.

Figure 2:
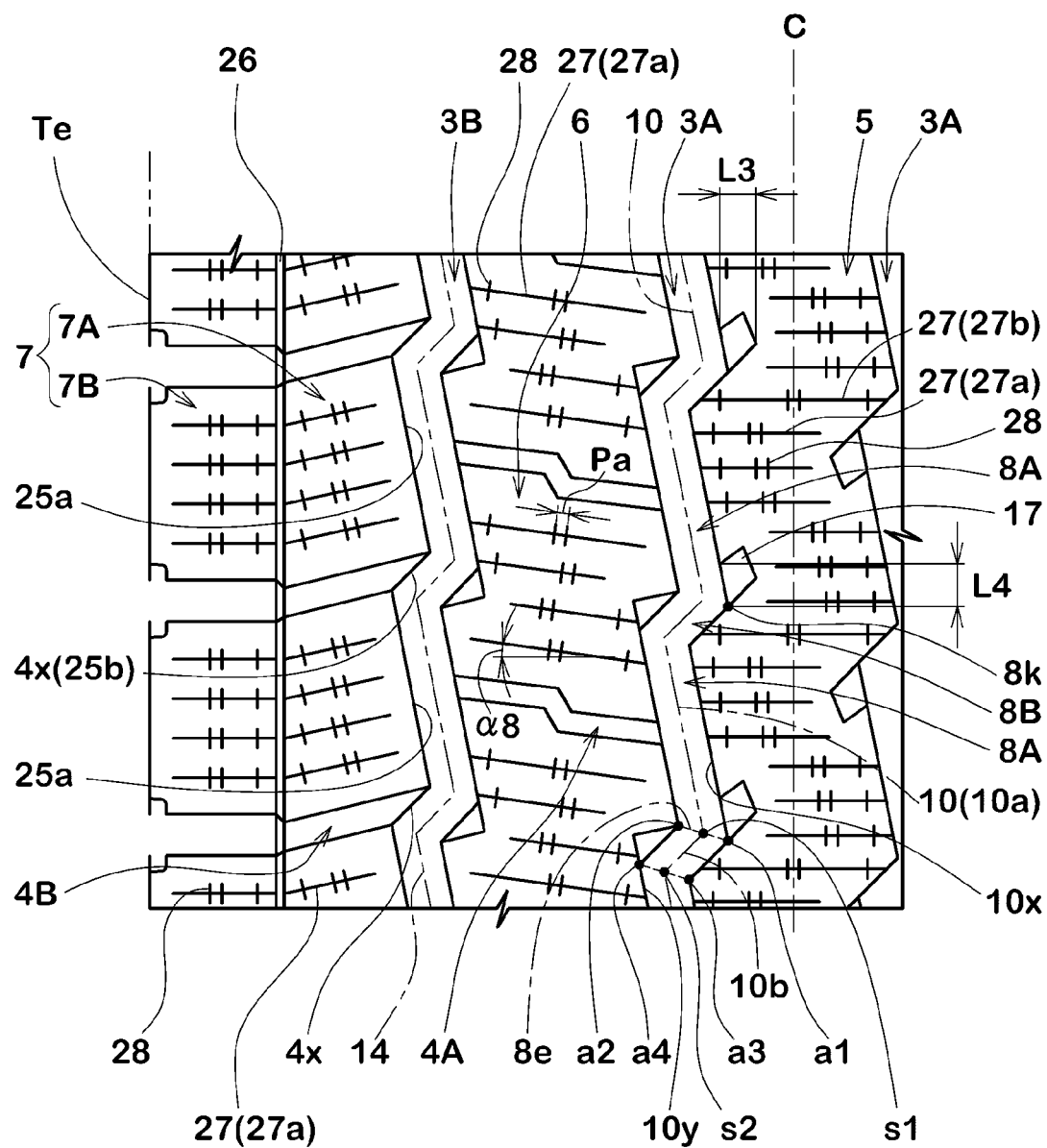
FIG. 2 is a closeup of the tread portion show in FIG. 1.

The long groove segments 8A and the short groove segments 8B of each of the crown main grooves 3A are inclined with respect to the tire circumferential direction such that the widthwise center lines 10a of the long groove segments 8A are inclined in one direction (in FIG. 1, a left side upward inclination), and the widthwise center lines 10b of the short groove segments 8B are inclined in one direction opposite to that of the long groove segments 8A (in FIG. 1, a right side upward inclination). As shown in FIG. 2, the widthwise center line 10 of the crown main groove 3A is made up of straight lines connecting between midpoints s1 and midpoints s2, wherein the midpoints s1 are respectively between the axially innermost points a1 of the axially inner groove edge 10x of the crown main groove 3A and the axially innermost points a2 of the axially outer groove edge 10y of the crown main groove 3A, and the midpoints s2 are respectively between the axially outermost points a3 of the axially inner groove edge 10x and the axially outermost points a4 of the axially outer groove edge 10y. The widthwise center line 14 of the shoulder main groove 3B is also defined in the same manner as above.

The intersecting positions 8e of the long crown groove segments 8A and the short crown groove segments 8B are indicated in FIG. 2 by an imaginary line.

In this specification, the axially inner groove edge 10x and the axially outer groove edge 10y of the crown main groove 3A are treated as including edges (hereinafter "opening edges") of notches, rug grooves and the like if such have depths less than the depth of the crown main groove 3A and open to the crown main groove 3A.

The angle of the main groove is defined as the angle of the widthwise center line thereof.

If the angle α1 of the long crown groove segments 8A with respect to the tire circumferential direction is small, there is a possibility that the axial component of the edges is decreased. If the angle α1 is large, there is a possibility that the resistance to drainage of the crown main groove 3A increases and the drainage becomes insufficient.

Therefore, the angle α1 of the long crown groove segments 8A is preferably not less than 5 degrees, more preferably not less than 7 degrees, but not more than 20 degrees, more preferably not more than 18 degrees.

It is not essential but preferable that the angle α2 of the short crown groove segments 8B with respect to the tire circumferential direction is not less than 30 degrees, more preferably not less than 35 degrees, but not more than 60 degrees, more preferably not more than 55 degrees.

If the angle α2 of the short crown groove segments 8B is large, there is a possibility that the drainage becomes insufficient. If the angle α2 is small, there is a possibility that running performance on icy roads is deteriorated.

In the first embodiment, the shoulder main grooves 3B are formed as a zigzag groove made up of long shoulder groove segments 11A and short shoulder groove segments 11B which are arranged alternately in the tire circumferential direction.

The long shoulder groove segments 11A are inclined in one direction with respect to the tire circumferential direction (in FIG. 1, a left side upward inclination).

The short shoulder groove segments 11B each have a circumferential length shorter than that of the long shoulder groove segments 11A. Such shoulder main groove 3B has an axial component in its edges and improves running performance on icy roads in the same manner as the crown main groove 3A.

In order to improve the running performance on icy roads and drainage in a good balance, the angle α3 of the long shoulder groove segments 11A with respect to the tire circumferential direction is preferably not less than 5 degrees, more preferably not less than 7 degrees, but more than 20 degrees, more preferably not more than 18 degrees.

The angle α4 of the short shoulder groove segments 11B with respect to the tire circumferential direction is preferably not less than 30 degrees, more preferably not less than 35 degrees, but not more than 60 degrees, more preferably not more than 55 degrees.

If the main grooves 3A and 3B are decreased in the width and/or depth, there is a possibility that the drainage becomes insufficient. If the main grooves 3A and 3B are increased in the width and/or depth, there is a possibility that the land portion 5 and the blocks 6,7 are decreased in the rigidity and the uneven wear resistance is deteriorated.

Therefore, it is preferable that the widths W1 and W2 of the main grooves 3A and 3B are set in a range of from 2% to 6% of the tread width TW, and the depth D1 and D2 of the main grooves 3A and 3B are set in a range of from 10 to 15 mm.

In order to secure the axial rigidity of the land portion 5 and the blocks 6, 7 in a well balanced manner, the axial distance L1 between the crown main groove 3A and the tire equator C is preferably set in a range of from 5% to 13% of the tread width TW, and the axial distance L2 between the shoulder main groove 3B and the tire equator C is preferably set in a range of from 24% to 32% of the tread width TW.

Here, the axial position of the main groove 3A, 3B is defined as the axial position of the widthwise center line 10,14 thereof if it is linear. If nonlinear, the axial position of the amplitude center G1, G2 of the widthwise center line 10, 14 is used instead.

The middle axial groove 4A has a crank shape and comprises a pair of outside portions 12a extending straight and inclined with respect to the tire axial direction at a constant angle (in FIG. 1, a left side upward inclination), and an inside portion 12b extending between the outside portions 12a and inclined at an angle more than those of the outside portions 12a. Such middle axial groove 4A has a large circumferential component in its edges and improves running performance on icy roads.

If the angle α5 of the outside portions 12a with respect to the tire axial direction is large, there is a possibility that the axial component of the edges of the middle block 6 becomes small, and the drive power and braking force can not be effectively increased. If the angle α5 is small, there is a possibility that the circumferential component of the edges can not be effectively increased.

Therefore, the angle α5 of the outside portions 12a is preferably not less than 3 degrees, more preferably not less than 4 degrees, but not more than 10 degrees, more preferably not more than 9 degrees.

If the angle α6 of the inside portion 12b with respect to the tire axial direction is large, there is a possibility that the axial rigidity of the middle block 6 becomes low, and uneven wear resistance is deteriorated. If the angle α6 is small, there is a possibility that the circumferential component of the edges can not be effectively increased.

Therefore, the angle α6 of the inside portion 12b is preferably not less than 45 degrees, more preferably not less than 55 degrees, but not more than 75 degrees, more preferably not more than 70 degrees.

If the width W3 and depth D3 of the middle axial groove 4A are large, there is a possibility that the rigidity of the middle block 6 is decreased. If the width W3 and depth D3 of the middle axial groove 4A are small, there is a possibility that the drainage becomes insufficient.

Therefore, the width W3 of the middle axial groove 4A is preferably not less than 1.5 mm, more preferably not less than 2.0 mm, but not more than 3.5 mm, more preferably not more than 3.0 mm, and the depth D3 of the middle axial groove 4A is preferably not less than 6.5 mm, more preferably not less than 7.0 mm, but not more than 10.0 mm, more preferably not more than 9.5 mm.

In this example, the middle axial groove 4A has a constant width along its length.

The shoulder axial groove 4B comprises an oblique portion 13a extending from the shoulder main groove 3B toward the tread edge Te, while inclining in one direction (in FIG. 1, a right side upward inclination), and an axially-extending portion 13b extending between the oblique portion 13a and the tread edge Te in parallel with the tire axial direction.

In this example, the oblique portion 13a and the axially-extending portion 13b are straight. Thereby, the resistance to drainage of the shoulder axial groove 4B becomes decreased. Further, the rigidity of the shoulder block 7 can be secured, and the cornering performance can be improved.

It is not essential but preferable that the angle α7 of the oblique portion 13a with respect to the tire axial direction is preferably not less than 10 degrees, more preferably not less than 12 degrees, but not more than 20 degrees, more preferably not more than 18 degrees.

The width W4 of the oblique portion 13a is preferably not less than 6%, more preferably not less than 8%, but not more than 16%, more preferably not more than 14% of one pitch P1 of the shoulder block row 7R (as shown in FIG. 1, circumferential pitch P1 for arranging the shoulder blocks). If the width W4 of the oblique portion 13a is large, there is a possibility that the rigidity of the shoulder block 7 is decreased. If the width W4 is small, there is a possibility that the drainage becomes insufficient.

In this example, the width W5 of the axially-extending portion 13b is more than the width W4 of the oblique portion 13a. Thereby, water coming from the oblique portion 13a can be smoothly discharged from the tread edge Te.

In order to secure the rigidity of the shoulder block 7 while exerting the above-explained function, the groove width W5 of the axially-extending portion 13b is preferably not less than 1.2 times, more preferably not less than 1.3 times, but not more than 2.4 times, more preferably not more than 2.3 times the groove width W4 of the oblique portion 13a.

As shown in FIG. 3, the groove depth D4 of the oblique portion 13a is preferably not less than 5.0 mm, more preferably not less than 5.5 mm, but not more than 8.0 mm, more preferably not more than 7.5 mm.

The groove depth D5 of the axially-extending portion 13b is set to be more than the groove depth D4 of the oblique portion in order to smoothly discharge water in the shoulder axial groove 4B from the tread edge Te.

Therefore, the groove depth D5 of the axially-extending portion 13b is preferably not less than 1.2 times, more preferably not less than 1.3 times, but not more than 1.8 times, more preferably not more than 1.7 times the groove depth D4 of the oblique portion 13a.

As shown in FIG. 2, the central land portion 5 is provided with central notches 17 extending from the crown main grooves 3A toward the tire equator C and terminating within the central land portion 5. Such central notches 17 have edges and thereby improve running performance on icy roads.

The central notches 17 are disposed in both sides in the tire axial direction of the central land portion 5 alternately in the tire circumferential direction.

The depth D6 of the central notches 17 is less than the depth D1 of the crown main groove 3A in order to maintain the axial rigidity of the central land portion 5.

The maximum axial length L3 of the central notch 17 is 10% to 15% of the maximum axial length wc of the central land portion 5, the circumferential length L4 of the opening edge of the central notch 17 is 10% to 15% of one pitch P1 of the shoulder block row 7R, and the depth D6 of the central notch 17 is 55% to 65% of the depth D1 of the crown main groove 3A.

If the maximum axial length L3 of the central notch 17 is less than 10% of the maximum axial length wc of the central land portion 5, the drainage can not be improved. Further, the edges of the central notches 17 can not be effectively increased, and running performance on icy roads can not be improved.

If the maximum axial length L3 is more than 15% of the maximum axial length wc, the rigidity of the central land portion 5 is decreased.

Therefore, the maximum length L3 of the central notch 17 is preferably not less than 11% and not more than 14% of the maximum length wc of the central land portion 5.

If the circumferential length L4 of the opening edge of the central notch 17 is less than 10% of one pitch P1 of the shoulder block row 7R, the drainage can not be increased.

If the circumferential length L4 is more than 15% of one pitch P1, the ground contacting area of the central land portion 5 becomes small, and the rigidity of the central land portion 5 is decreased. Therefore, the circumferential length L4 of the opening edge is preferably not less than 11% and not more than 14% of one pitch P1 of the shoulder block row 7R.

If the depth D6 of the central notch 17 exceeds 65% of the depth D1 of the crown main groove 3A, the rigidity of the central land portion 5 is decreased. If the depth D6 is less than 55% of the depth D1, the drainage can not be fully improved. Therefore, the depth D6 of the central notch 17 is preferably not less than 57% and not more than 63% of the depth D1 of the crown main groove 3A.

As explained above, by specifically defining the maximum axial length L3 of the central notch 17 and the circumferential length L4 of the opening edge and also the depth D6, running performance on icy roads, the uneven wear resistance and the drainage can be improved in a good balance.

If the shape of the central notch 17 in it top view is triangular, there is a possibility that ice shaved by the edges stays in the central notches 17 and running performance on icy roads can not be effectively improved.

Therefore, it is preferable that the shape of the central notch 17 in it top view is a polygon having 4 or more sides. However, if the polygon has 6 or more sides, there is a possibility that the resistance to drainage becomes increased. Further, there is a possibility that the production efficiency is deteriorated because such notch is difficult to form.

Therefore, polygons having 5 or less sides are preferred. Here, the "sides" in the top view include the edge of the central notch 17 extending in the central land portion 5 and a part of the axially inner groove edge 10x of the crown main groove 3A (namely, the opening edge of the central notch 17).

Excepting one of the sides of the polygon of the central notch 17 which corresponds to the above-mentioned part of the axially inner groove edge 10x, the internal angle(s) θ between the sides (shown in FIG. 4) is(are) preferably not less than 60 degrees, more preferably not less than 65 degrees, but not more than 120 degrees, more preferably not more than 115 degrees in order to prevent the shaved ice from staying in the central notches 17 without spoiling the edge effect.

The central notch 17 is formed so as to include the intersection 8k of the long crown groove segment 8A and short crown groove segment 8B. The intersection 8k corresponds to one of reentrant corners of the central land portion 5.

Each edge 15 of the central land portion 5 comprises long central edge segments 15A extending along the long crown groove segments 8A and short central edge segments 15B extending between the long central edge segments 15A.

The long central edge segments 15A are inclined in one direction (in FIG. 1, a left side upward inclination), and the short central edge segments 15B are inclined in one direction opposite to that of the long central edge segments 15A (in FIG. 1, a right side upward inclination).

The central notch 17 has an edge 17a which smoothly continues to the short central edge segment 15B. Such edge 17a decreases the ground pressure at the intersection 8k and leads water in the central notch 17 smoothly to the crown main groove 3A.

In this example, the edge 17a and the short central edge segment 15B are formed in line.

The middle block 6 has a circumferentially-extending axially inner middle block edge 19 and a circumferentially-extending axially outer middle block edge 20.

The axially inner middle block edge 19 comprises a short middle block edge segment 19A inclined with respect to the tire circumferential direction in one direction (in FIG. 4, a right side upward inclination) and a pair of long middle block edge segments 19B having a circumferential length longer than the circumferential length of the short middle block edge segment 19A, and extending between the short middle block edge segments 19A, while inclining with respect to the tire circumferential direction in one direction opposite to that of the short middle block edge segments 19A (in FIG. 4, a left side upward inclination).

The axially outer middle block edge 20 comprises a short middle block edge segment 20A inclined with respect to the tire circumferential direction in one direction (in FIG. 4, a right side upward inclination), and a pair of long middle block edge segments 20B having a circumferential length longer than the circumferential length of the short middle block edge segment 20A, and extending between the short middle block edge segments 20A, while inclining in one direction opposite to that of the short middle block edge segments 20A (in FIG. 4, a left side upward inclination).

In this example, the arrangement pitch of the short central edge segments 15B is the same as the arrangement pitch of the short middle block edge segments 19A.

In the tire circumferential direction, each of short middle block edge segments 19A overlaps with the adjacent short central edge segment 15B. Such overlap 21 decreases the resistance to drainage of the crown main groove 3A. Further, between the circumferentially adjacent overlaps 21, the rigidity of the central land portion 5 and the middle blocks 6 can be maintained.

The circumferential length Lk of such overlap 21 is preferably not less than 6.5%, more preferably not less than 7.0%, but not more than 10.5%, more preferably not more than 10.0% of one pitch P2 of the middle block row 6R (as shown in FIG. 4, circumferential pitch P2 for arranging the middle blocks).

The middle block 6 is provided with
an inside middle block notch 23 extending axially outwardly from the crown main groove 3A and terminating within the middle block 6, and
an outside middle block notch 24 extending toward the tire equator C from the shoulder main groove 3B and terminating within the middle block 6.

The depth D7 of the inside middle block notch 23 is less than the depth D1 of the crown main groove 3A.

The depth D8 of the outside middle block notch 24 is less than the groove depth D2 of the shoulder main groove 3B.

Such notches 23 and 24 lead the water existing between the middle block 6 and the road surface to the crown main groove 3A and the shoulder main groove 3B and improve drainage. The notches 23 and 24 have edges and improve running performance on icy roads. The notches 23 and 24 maintain the rigidity of the middle block 6.

The inside middle block notch 23 is formed within the length of the short crown groove segment 8B in which the resistance to drainage becomes relatively large, and
the outside middle block notch 24 is formed within the length of the short shoulder groove segment 11B in which the resistance to drainage becomes relatively large.

Therefore, the resistance to drainage of the crown main groove 3A and the resistance to drainage of the shoulder main groove 3B are reduced, and the drainage can be improved.

In this example, the opening edge of the inside middle block notch 23 extends over the entire length of the short middle block edge segment 19A, and
the opening edge of the outside middle block notch 24 extends over the entire length of the short middle block edge segment 20A. Thereby, water in the notches 23 and 24 is smoothly led into the long crown groove segment 8A and the long shoulder groove segment 11A. Thus, the drainage can be further improved.

In this example, the inside middle block notch 23 has an edge 23a smoothly continued from the long middle block edge segment 19B. Such edge 23a can smoothly lead water existing in the inside middle block notch 23 into the crown main groove 3A, while increasing the rigidity at the intersection between the long middle block edge segment 19B and the short middle block edge segment 19A.

The outside middle block notch 24 has an edge 24a smoothly continued from the long middle block edge segments 20B. Such edge 24a can smoothly lead water existing in the outside middle block notch 24 into the shoulder main groove 3B, while increasing the rigidity at the intersection between the long middle block edge segment 20B and the short middle block edge segment 20A.

The edge 23a and the long middle block edge segment 19B are formed in line. Also the edge 24a and the long middle block edge segment 20B are formed in line.

If the maximum axial length L5 of the inside middle block notch 23 is large, there is a possibility that the rigidity of the middle block 6 becomes low, and the uneven wear resistance is deteriorated. If the maximum axial length L5 of the inside middle block notch 23 is small, the edge of the inside middle block notch 23 becomes decreased.

Therefore, the maximum axial length L5 of the inside middle block notch 23 is preferably not less than 10%, more preferably not less than 11%, but not more than 15%, more preferably not more than 14% of the maximum axial length wm of the middle block 6.

For similar reasons, the maximum axial length L7 of the outside middle block notch 24 is preferably not less than 10%, more preferably not less than 11%, but not more than 15%, more preferably not more than 14% of the maximum axial length wm of the middle block 6.

If the circumferential length L6 of the opening edge of the inside middle block notch 23 is large, there is a possibility that the rigidity of the middle block 6 becomes low, and the uneven wear resistance is deteriorated.

If the circumferential length L6 is small, there is a possibility that the drainage becomes insufficient.

Therefore, the circumferential length L6 of the opening edge is preferably not less than 10%, more preferably not less than 11%, but not more than 15%, more preferably not more than 14% of one pitch P1 of the shoulder block row 7R.

For similar reasons, the circumferential length L8 of the opening edge of the outside middle block notch 24 is preferably not less than 10%, more preferably not less than 11%, but not more than 15%, more preferably not more than 14% of one pitch P1 of the shoulder block row 7R.

As shown in FIG. 3, the depth D7 of the inside middle block notch 23 is preferably not less than 55%, more preferably not less than 57%, but not more than 65%, more preferably not more than 63% of the depth D1 of the crown main groove 3A. If the depth D7 of the inside middle block notch 23 is large, there is a possibility that the rigidity of the middle block 6 becomes low, and the uneven wear resistance is deteriorated. If the depth D7 of the inside middle block notch 23 is small, there is a possibility that drainage can not be improved.

For similar reasons, the depth D8 of the outside middle block notch 24 is preferably not less than 55%, more preferably not less than 57%, but not more than 65%, more preferably not more than 63% of the depth D2 of the shoulder main groove 3B.

As shown in FIG. 2, the shoulder block row 7R has an axially inner edge comprising
a plurality of long shoulder block edges 25a inclining with respect to the tire circumferential direction in one direction (in FIG. 2, a left side upward inclination), and
a plurality of short shoulder block edges 25b extending between the long shoulder block edges 25a and having a circumferential length shorter than the circumferential length of the long shoulder block edges 25a.

Each of the short shoulder block edges 25b corresponds to the opening edge 4x of one of the shoulder axial grooves 4B. Each of the long shoulder block edges 25a corresponds to the axially inner edge of one of the shoulder blocks 7.

Therefore, the axial rigidity of the shoulder block 7 is maintained. As the opening edge 4x of the shoulder axial groove 4B is located in an area where the resistance to drainage of the shoulder main groove 3B is relatively high, water in the shoulder main groove 3B is smoothly led into the shoulder axial groove 4B.

As shown in FIG. 1, the shoulder block 7 is crossed by a shoulder narrow groove 26 extending straight continuously in the tire circumferential direction. Thereby, the shoulder block 7 is divided into an inside block 7A axially inside the shoulder narrow groove 26 and an outside block 7B axially outside the inside block 7A. Such shoulder narrow groove 26 brings out a large edge effect in the tire axial direction and improves cornering performance.

If the width W6 of the shoulder narrow groove 26 is large, there is a possibility that the axial rigidity of the inside block 7A or outside block 7B becomes low, and uneven wear resistance is deteriorated. If the width W6 is small, there is a possibility that drainage becomes decreased.

Therefore, the width W6 of the shoulder narrow groove 26 is preferably not less than 0.5 mm, more preferably not less than 0.8 mm, but not more than 1.5 mm, more preferably not more than 1.2 mm.

For similar reasons, the depth D9 of the shoulder narrow groove 26 is preferably not less than 5.0 mm, more preferably not less than 5.5 mm, but preferably not more than 8.0 mm, more preferably not more than 7.5 mm.

The axially outer end of the oblique portion 13a is connected to the shoulder narrow groove 26.

As shown in FIG. 2, the central land portion 5, the middle blocks 6, the inside blocks 7A and the outside blocks 7B are each provided with axially extending sipes 27. Such sipes 27 increase the axial edge component, and improve running performance on icy roads. In this example, the sipes 27 include a semi-open sipe 27a having an end opened to the main groove 3A, 3B or shoulder narrow groove 26 and an end terminating within the central land portion 5 or the block 6, 7, and an open sipe 27b having both ends opened to the crown main grooves 3A.

The open sipes 27b are disposed in only the central land portion 5 where the ground pressure is relatively high during straight running, therefore, the drive power and braking force during straight running is increased, and the straight running stability on icy roads can be improved.

In this embodiment, the sipes 27 are straight sipes, therefore, the axial edge component is increased and running performance on icy roads can be further improved. The sipes 27 are not limited to such configuration. Various configurations, e.g. wavy configuration may be employed.

The angle $\alpha 8$ of the sipe 27 with respect to the tire axial direction is preferably set in a range of from 0 to 30 degrees in order to maintain the improved drive power and braking force.

The sipes 27 provided in the central land portion 5 are not connected to the central notches 17, therefore, the rigidity of the central land portion 5 is maintained, and uneven wear resistance is improved.

In this embodiment, the central land portion 5 and the blocks 6, 7A and 7B are each provided with cross sipes 28 crossing the sipes 27 orthogonally thereto and having lengths less than those of the sipes 27. Such cross sipes 28 increase the circumferential edge component and improve the cornering performance.

In this example, in order to uniform the rigidity of each of the central land portion 5 and the blocks 6, 7A and 7B in the tire axial direction, in an axially outside region So of each of the central land portion 5 and the blocks 6, 7A and 7B, one cross sipe 28 is formed, and in an axially inside region Si two cross sipe 28 are formed.

For example, in the case of the middle block 6, the inside region Si is, as shown in FIG. 4, a region extending 25% of the maximum length wm of the middle block 6 from the axial midpoint Cp of the middle block 6 toward each side thereof in the tire axial direction, and the outside region So is therefore, a region formed on each side of the inside region Si.

For each of the central land portion 5, the inside block 7A and the outside block 7B, the inside region Si and the outside region So are defined as a central 50% region and a lateral 25% region in the same manner as above.

It is not essential but preferable that the pitch Pa between the two cross sipes 28 provided with in the inside region Si is in a range of from 4% to 8% of the maximum axial width of the central land portion 5 or block 6,7A,7B provided with the two cross sipes 28 in order to effectively derive the above advantageous effect.

Preferably, the land ratio, namely, the ratio of the ground contacting area of the tread portion 2 to the overall area of the tread portion 2, is set in a range of from 68% to 72% in order to improve running performance on icy roads, uneven wear resistance and drainage in a well balanced manner.

FIG. 5 shows a modification of the above described first embodiment, wherein the central land portion 5, the middle blocks 6 and shoulder block 7 are each provided with zigzag sipes 30 instead of the linear sipes 27 and 28. Such sipes 30 increase the circumferential edge component and the axial edge component and improve running performance on snowy roads.

Comparison Tests

Pneumatic tires having tread patterns based on FIG. 1 and specifications shown in Table 1, and pneumatic tires having tread patterns based on FIG. 5 and specifications shown in Table 2 were prepared and tested for the drainage, running performance on icy roads and uneven wear resistance.

Common specifications are as follows:
tire size: 195/80R15 (rim size: 15×6.03)
tread width TW: 162 mm
main groove depth D1: 12.5 mm
main groove depth D2: 12.5 mm
middle axial groove depth D3: 9.0 mm
oblique portion's groove depth D4: 7.0 mm
axially-extending portion's groove depth D5: 10.5 mm
shoulder narrow groove depth D9: 7.0 mm
inside middle block notch depth D7: 9.0 mm
outside middle block notch depth D8: 9.0 mm
sipes' depth: 8.0 mm
cross sipes' depth: 4.0 mm
central notch's internal angles $\theta$:
   quadrilateral: 100 and 100 degrees (Exs. 1-7, Refs. 1-7, Exs. 1R-7R, Refs. 1R-7R)
   triangle: 90 degrees (Exs.8 and 8R)
   pentagon: 110, 110 and 110 degrees (Exs. 9 and 9R)
<Drainage>

The test tires were mounted on the four wheels of a test car (2700 cc 4WD passenger car).

Tire pressure: 350 kPa (front), 425 kPa (rear)

The test car was run on an asphalt road in a tire test course covered with 2 to 5 mm depth of water, and the test driver evaluated running characteristics about the steering response, rigid feeling, grip and the like.

The results are indicated in Tables 1 and 2 by an index based on Ex. 1 and Ex. 1R being 100, wherein the larger the value, the better the performance (under 95 is not acceptable).

<Running Performance on Icy Roads>

The above-mentioned test car was run on an icy road in the tire test course, and the test driver evaluated running characteristics about the steering response, rigid feeling, grip and the like.

The results are indicated in Tables 1 and 2 by an index based on Ex. 1 and Ex. 1R being 100, wherein the larger the value, the better the performance (under 95 is not acceptable).

<Uneven Wear Resistance>

The above-mentioned test car was run on a dry asphalt road for 10000 km. Then, there were measured at eight circumferential positions around the tire, the amount of wear of the central land portion at its both edges, and the amount of wear of the middle block at its both edges to obtain the difference between the maximum and the minimum of the amount of wear.

The results are indicated in Tables 1 and 2 by an index based on Ex. 1 and Ex. 1R being 100, wherein the larger the value, the better the performance (under 95 is not acceptable).

From the test results, it was confirmed that, in comparison with comparative tires, Embodiment tires were significantly improved in the drainage, running performance on icy roads and uneven wear resistance.

Figure 7:
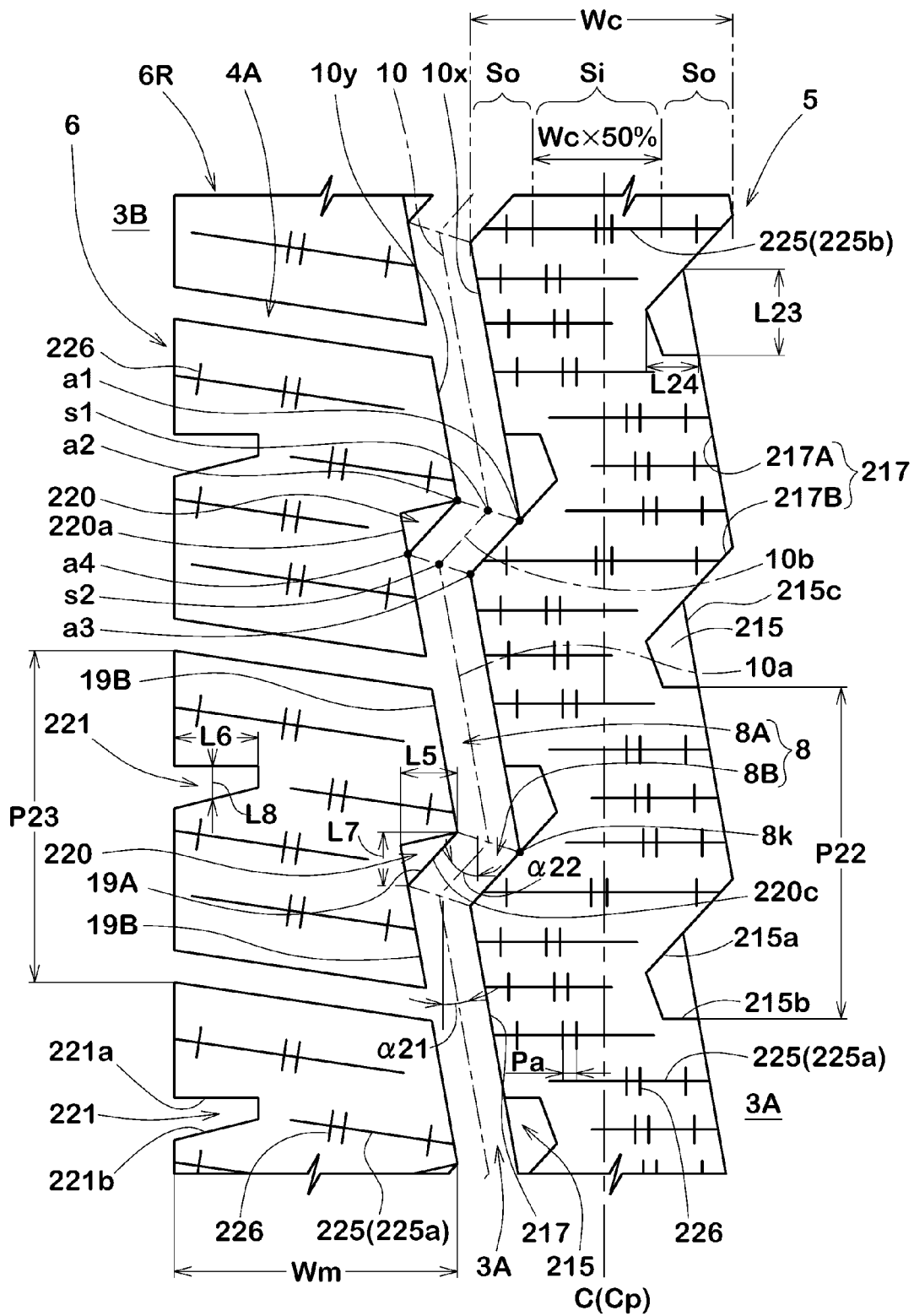
FIG. 7 is a closeup of the tread portion show in FIG. 6 showing the central land portion and the middle block row.

As shown in FIG. 7, the widthwise center line 10 of the crown main groove 3A is made up of straight lines connecting between midpoints s1 and midpoints s2, wherein the midpoints s1 are respectively between the axially innermost points a1 of the axially inner groove edge 10x of the crown main groove 3A and the axially innermost points a2 of the axially outer groove edge 10y of the crown main groove 3A, and the midpoints s2 are respectively between the axially outermost points a3 of the axially inner groove edge 10x and the axially outermost points a4 of the axially outer groove edge 10y.

The widthwise center line 14 of the shoulder main groove 3B is also defined in the same manner as above.

The angle of the main groove is defined as the angle of the widthwise center line thereof.

TABLE 1

| Tire | Ref. 1 | Ex. 1 | Ref. 2 | Ex. 2 | Ex. 3 | Ref. 3 | Ref. 4 | Ex. 4 | Ex. 5 | Ref. 5 | Ref. 6 | Ex. 6 | Ex. 7 | Ref. 7 | Ex. 8 | Ex. 9 |
|---|---|---|---|---|---|---|---|---|---|---|---|---|---|---|---|---|
| central notches | | | | | | | | | | | | | | | | |
| shape *1 | — | 4 | 4 | 4 | 4 | 4 | 4 | 4 | 4 | 4 | 4 | 4 | 4 | 4 | 3 | 5 |
| L3/Wc (%) | — | 13 | 9 | 10 | 15 | 16 | 13 | 13 | 13 | 13 | 13 | 13 | 13 | 13 | 13 | 13 |
| L4/P1 (%) | — | 13 | 13 | 13 | 13 | 13 | 9 | 10 | 15 | 16 | 13 | 13 | 13 | 13 | 13 | 13 |
| D6/D1 (%) | — | 60 | 60 | 60 | 60 | 60 | 60 | 60 | 60 | 60 | 50 | 55 | 65 | 70 | 60 | 60 |
| drainage | 90 | 100 | 95 | 98 | 102 | 102 | 93 | 98 | 99 | 97 | 101 | 102 | 98 | 95 | 98 | 100 |
| on-ice performance | 90 | 100 | 95 | 98 | 102 | 102 | 93 | 98 | 102 | 103 | 93 | 98 | 101 | 101 | 97 | 100 |
| wear resistance | 101 | 100 | 101 | 100 | 98 | 95 | 101 | 100 | 98 | 95 | 101 | 100 | 98 | 95 | 100 | 100 |

*1 3: triangular, 4: quadrilateral, 5: pentagonal

TABLE 2

| Tire | Ref. 1R | Ex. 1R | Ref. 2R | Ex. 2R | Ex. 3R | Ref. 3R | Ref. 4R | Ex. 4R | Ex. 5R | Ref. 5R | Ref. 6R | Ex. 6R | Ex. 7R | Ref. 7R | Ex. 8R | Ex. 9R |
|---|---|---|---|---|---|---|---|---|---|---|---|---|---|---|---|---|
| central notches | | | | | | | | | | | | | | | | |
| shape *1 | — | 4 | 4 | 4 | 4 | 4 | 4 | 4 | 4 | 4 | 4 | 4 | 4 | 4 | 3 | 5 |
| L3/Wc (%) | — | 13 | 9 | 10 | 15 | 16 | 13 | 13 | 13 | 13 | 13 | 13 | 13 | 13 | 13 | 13 |
| L4/P1 (%) | — | 13 | 13 | 13 | 13 | 13 | 9 | 10 | 15 | 16 | 13 | 13 | 13 | 13 | 13 | 13 |
| D6/D1 (%) | — | 60 | 60 | 60 | 60 | 60 | 60 | 60 | 60 | 60 | 50 | 55 | 65 | 70 | 60 | 60 |
| drainage | 89 | 100 | 95 | 97 | 102 | 103 | 92 | 99 | 98 | 96 | 101 | 103 | 99 | 95 | 99 | 100 |
| on-ice performance | 91 | 100 | 94 | 98 | 103 | 102 | 94 | 98 | 103 | 104 | 94 | 98 | 101 | 101 | 97 | 100 |
| wear resistance | 101 | 100 | 102 | 100 | 99 | 94 | 102 | 100 | 97 | 95 | 101 | 100 | 99 | 96 | 100 | 100 |

*1 3: triangular, 4: quadrilateral, 5: pentagonal

Second Embodiment

Figure 6:
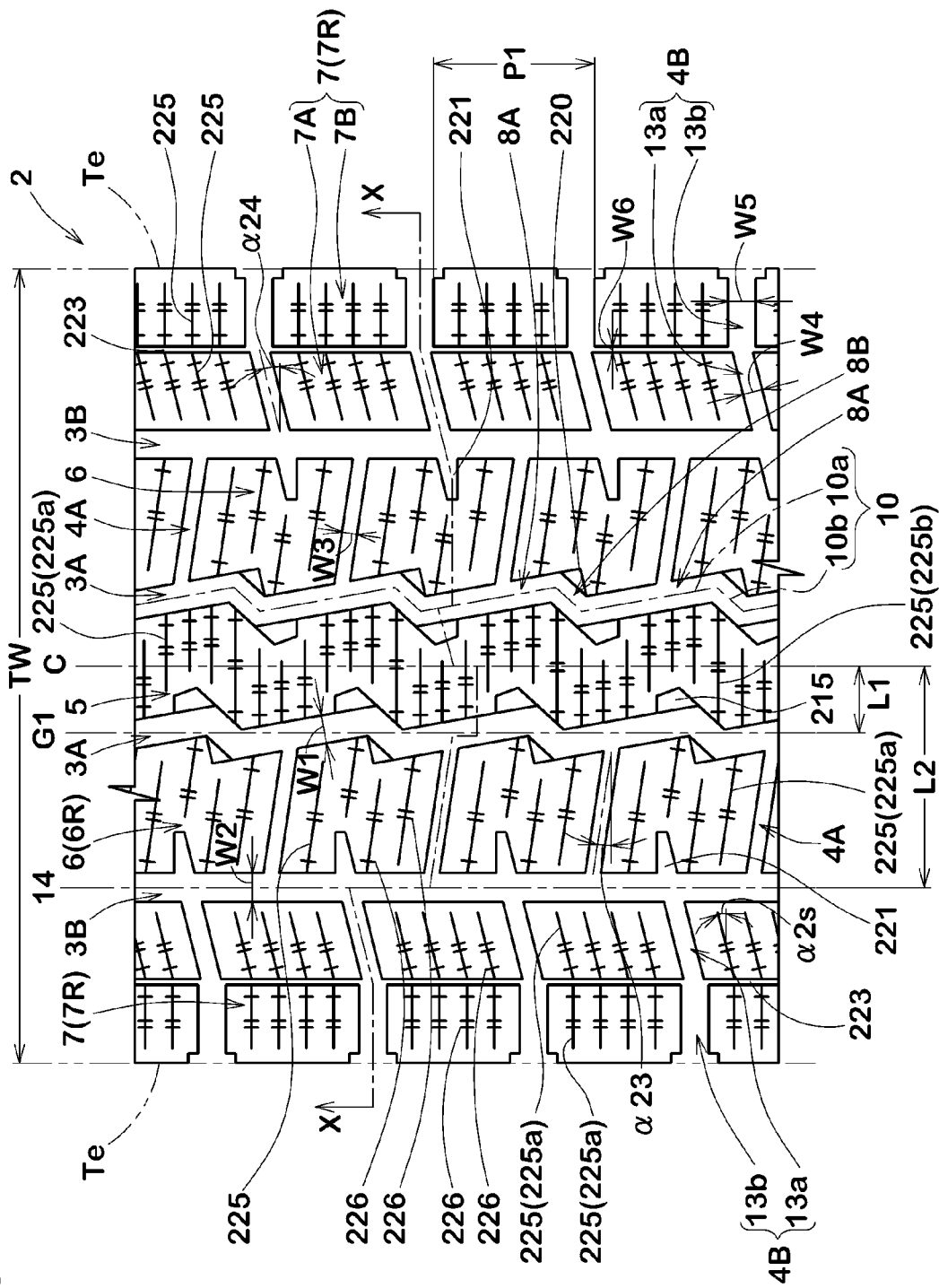
FIG. 6 is a developed partial view of the tread portion of a pneumatic tire as a second embodiment of the present invention.
Figure 8:
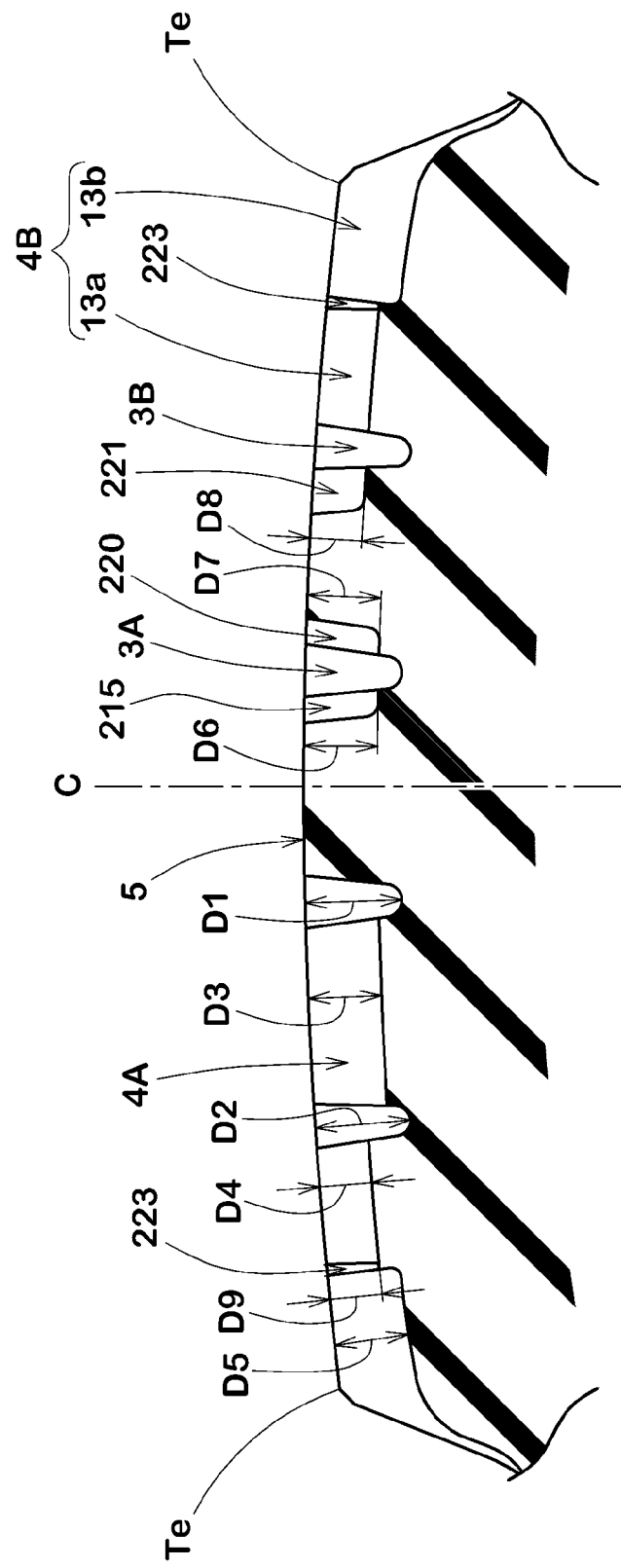
FIG. 8 is a cross sectional view of the tread portion taken along line x-x in FIG. 6.
Figure 9:
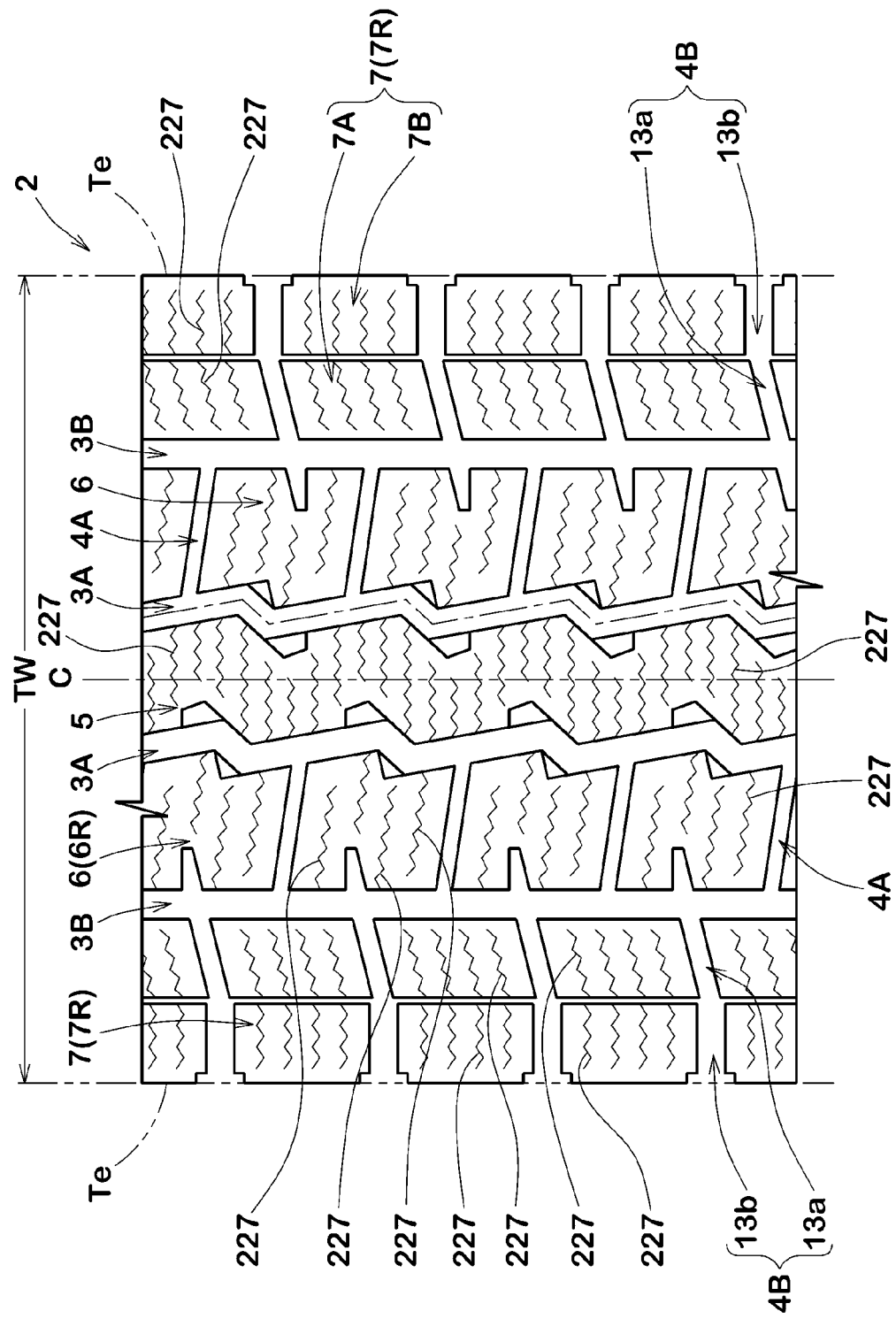
FIG. 9 shows a modification of the tread portion shown in FIG. 6, wherein configurations of sipes are changed otherwise the tread pattern is the same as that shown in FIG. 6.

FIGS. 6-8 show a second embodiment of the present invention, and FIG. 9 shows a modification thereof.

In the second embodiment, the crown main grooves 3A are a zigzag groove made up of long groove segments 8A and short groove segments 8B which are arranged alternately in the tire circumferential direction. Since the edges of such crown main groove 3A include an axial component, the drive power and braking force become increased, and accordingly, running performance on icy roads can be improved.

The long groove segments 8A and the short groove segments 8B of each of the crown main grooves 3A are inclined with respect to the tire circumferential direction such that the widthwise center lines 10a of the long groove segments 8A are inclined in one direction (in FIG. 6, a left side upward inclination), and the widthwise center lines 10b of the short groove segments 8B are inclined in one direction opposite to that of the long groove segments 8A (in FIG. 61, a right side upward inclination).

If the angle α21 of the long groove segments 8A with respect to the tire circumferential direction is small, there is a possibility that the axial component of the edges is decreased. If the angle α21 is large, there is a possibility that the resistance to drainage of the crown main groove 3A increases, and the drainage becomes insufficient.

Therefore, the angle α21 of the long groove segments 8A is preferably not less than 5 degrees, more preferably not less than 7 degrees, but not more than 20 degrees, more preferably not more than 18 degrees.

It is not essential but preferable that the angle α22 of the short groove segments 8B with respect to the tire circumferential direction is not less than 30 degrees, more preferably not less than 35 degrees, but not more than 60 degrees, more preferably not more than 55 degrees.

If the angle α22 of the short groove segments 8B is large, there is a possibility that the drainage becomes insufficient.

If the angle α22 of the short groove segments 8B is small, there is a possibility that running performance on icy roads is deteriorated.

In this embodiment, as shown in FIG. 6, the shoulder main grooves 3B are a straight groove parallel with the tire circumferential direction. Such main grooves 3B leads the water therein backward, and maintain the circumferential rigidity of the middle blocks 6 and the shoulder blocks 7 in order to improve the uneven wear resistance.

If the main grooves 3A and 3B are decreased in the width and/or depth, there is a possibility that the drainage becomes insufficient. If the main grooves 3A and 3B are increased in the width and/or depth, there is a possibility that the land portion 5 and the blocks 6,7 are decreased in the rigidity and the uneven wear resistance is deteriorated.

Therefore, it is preferable that the widths W1 and W2 of the main grooves 3A and 3B are set in a range of from 2% to 6% of the tread width TW, and the depth D1 and D2 of the main grooves 3A and 3B are set in a range of from 10 to 15 mm.

In order to secure the axial rigidity of the land portion 5 and the blocks 6, 7 in a well balanced manner, the axial distance L1 between the crown main groove 3A and the tire equator C is preferably set in a range of from 5% to 13% of the tread width TW, and
the axial distance L2 between the shoulder main groove 3B and the tire equator C is preferably set in a range of from 24% to 32% of the tread width TW.

The axial position of the main groove (3A,3B) is defined as the axial position of the widthwise center line (10,14) thereof if it is linear. If nonlinear, the axial position of the amplitude center (G1) of the widthwise center line (10) is used.

The middle axial grooves 4A extend straight, while inclining in one direction (in FIG. 6, a left side upward inclination). Such middle axial grooves 4A can discharge water smoothly from the crown main groove 3A toward the shoulder main groove 3B.

If the angle α23 of the middle axial groove 4A with respect to the tire axial direction is large, there is a possibility that the axial component of the edges of the middle blocks 6 becomes decreased, and the drive power and braking force is decreased. If the angle α23 is small, there is a possibility that the circumferential component of the edges can not be effectively increased.

Therefore, the angle α23 of the middle axial groove 4A is preferably not less than 2 degrees, more preferably not less than 4 degrees, but not more than 20 degrees, more preferably not more than 15 degrees.

If the width W3 and depth D3 of the middle axial groove 4A are large, there is a possibility that the rigidity of the middle block 6 is decreased. If the width W3 and depth D3 of the middle axial groove 4A are small, there is a possibility that the drainage becomes insufficient.

Therefore, the width W3 of the middle axial groove 4A is preferably not less than 2.0 mm, more preferably not less than 2.3 mm, but preferably not more than 4.3 mm, more preferably not more than 4.0 mm, and
the depth D3 of the middle axial groove 4A is preferably not less than 6.5 mm, more preferably not less than 7.0 mm, but not more than 10.0 mm, more preferably not more than 9.5 mm.

In this example, the middle axial groove 4A has a constant width along its length.

The shoulder axial groove 4B comprises an oblique portion 13a extending from the shoulder main groove 3B toward the tread edge Te, while inclining in one direction (in FIG. 6, a right side upward inclination), and
an axially-extending portion 13b extending between the oblique portion 13a and the tread edge Te in parallel with the tire axial direction.

In this example, the oblique portion 13a and the axially-extending portion 13b are straight. Thereby, the resistance to drainage of the shoulder axial groove 4B becomes small. Further, the rigidity of the shoulder block 7 can be secured, and the cornering performance can be improved.

It is not essential but preferable that the angle α24 of the oblique portion 13a with respect to the tire axial direction is preferably not less than 10 degrees, more preferably not less than 12 degrees, but not more than 20 degrees, more preferably not more than 18 degrees.

The width W4 of the oblique portion 13a is preferably not less than 6%, more preferably not less than 8%, but not more than 16%, more preferably not more than 14% of one pitch P1 of the shoulder block row 7R (as shown in FIG. 6, circumferential pitch P1 for arranging the shoulder blocks).

If the width W4 of the oblique portion 13a is large, there is a possibility that the rigidity of the shoulder block 7 is decreased. If the width W4 is small, there is a possibility that the drainage becomes insufficient.

In this example, the width W5 of the axially-extending portion 13b is more than the width W4 of the oblique portion 13a. Thereby, water coming from the oblique portion 13a can be smoothly discharged from the tread edge Te.

In order to secure the rigidity of the shoulder block 7 while exerting the above-explained function, the groove width W5 of the axially-extending portion 13b is preferably not less than 1.2 times, more preferably not less than 1.3 times, but not more than 2.4 times, more preferably not more than 2.3 times the groove width W4 of the oblique portion 13a.

The groove depth D4 of the oblique portion 13a is preferably not less than 5.0 mm, more preferably not less than 5.5 mm, but not more than 8.0 mm, more preferably not more than 7.5 mm.

The groove depth D5 of the axially-extending portion 13b is set to be more than the groove depth D4 of the oblique portion in order to smoothly discharge the water in the shoulder axial groove 4B from the tread edge Te.

As shown in FIG. 7, the central land portion 5 is provided with central notches 215 extending from the crown main grooves 3A toward the tire equator C, and terminating within the central land portion 5, and further having a depth D6 less than the depth D1 of the crown main grooves 3A.

Such central notches 215 increase the axial component and the circumferential component of the edges to increase friction against road surface and improve running performance on icy roads. The central notches 215 maintain the axial rigidity of the central land portion 5. The central notches 215 drain water existing between the central land portion 5 and the road surface toward the crown main grooves 3A.

The central notches 215 are disposed in both sides in the tire axial direction of the central land portion 5 alternately in the tire circumferential direction. Thereby, the axial rigidity of the central land portion 5 is evened in the tire circumferential direction.

The opening edge 15c of the central notch 215, which is a step to the crown main groove 3A facing the crown main groove 3A, has a depth D6 of from 55% to 65% of the depth D1 of the crown main groove 3A, and
a circumferential length L23 of from 15% to 25% of one pitch P22 of the central notches 215.

If the circumferential length L23 of the opening edge 15c of the central notch 215 is less than less than 15% of one pitch P22 of the central notch 215, the drainage can not be improved.

If the circumferential length L23 is more than 25% of one pitch P22 of the central notch 215, the ground contacting area of the central land portion 5 becomes small, and the rigidity of the central land portion 5 is decreased.

Therefore, the circumferential length L23 is preferably not less than 17%, but not more than 23% of one pitch P22 of the central notch 215.

If the depth D6 of the central notch 215 exceeds 65% of the depth D1 of the crown main groove 3A, the rigidity of the central land portion 5 is decreased. If the depth D6 is less than 55% of the depth D1 of the crown main groove 3A, the drainage can not be fully improved.

Therefore, the depth D6 of the central notch 215 is preferably not less than 57% and not more than 63% of the groove depth D1 of the crown main groove 3A.

As explained above, by specifically defining the circumferential length L24 of the opening edge and the depth D6 and the maximum axial length L23 of the central notch 215, running performance on icy roads, the uneven wear resistance and the drainage can be improved in a good balance.

If the maximum axial length L24 of the central notch 215 is large, there is a possibility that the rigidity of the central land portion 5 is decreased. If the maximum axial length L24 of the central notch 215 is small, there is a possibility that it becomes difficult to effectively improve the drainage. Further, it becomes difficult for the central notches 215 to provide effective edges in order to improve running performance on icy roads.

Therefore, the maximum axial length L24 of the central notch 215 is preferably not less than 10%, more preferably not less than 11%, but not more than 15%, more preferably not more than 14% of the maximum length we of the central land portion 5.

The central notch 215 is formed so as to include the intersection 8k of the long groove segment 8A and the short groove segment 8B. The intersection 8k corresponds to one of reentrant corners of the central land portion 5.

Each edge 217 of the central land portion 5 comprises long central edge segments 217A extending along the long groove segments 8A and short central edge segments 217B extending between the long central edge segments 217A.

The long central edge segments 217A are inclined in one direction (in FIG. 7, a left side upward inclination), and the short central edge segments 217B are inclined in one direction opposite to the long central edge segments 217A (in FIG. 8, a right side upward inclination).

The central notch 215 has a first edge 215a which smoothly continues to the short central edge segment 217B, and a second edge 215b which extends parallel with the tire axial direction. Such first edge 215a prevents stress concentration on the intersection 8k and increases rigidity.

The first edge 215a smoothly leads water or snow in the central notch 215 toward the crown main groove 3A.

In this example, the first edge 215a and the short central edge segment 217B are formed in line.

The second edge 215b has an axial component and improves running performance on icy roads.

The axially inner edge 19 of the middle block 6 comprises a short middle block edge segment 19A inclined with respect to the tire circumferential direction in one direction (in FIG. 7, a right side upward inclination), and a pair of long middle block edge segments 19B having a circumferential length longer than the circumferential length of the short middle block edge segment 19A, and extending between the short middle block edge segments 19A, while inclining with respect to the tire circumferential direction in one direction opposite to that of the short middle block edge segments 19A (in FIG. 7, a left side upward inclination).

The middle block 6 is provided with a middle notch 220 and a middle rug groove 221.

The middle notch 220 extends axially outwardly from the crown main groove 3A and terminates within the middle block and further has a depth D7 less than the depth D1 of the crown main groove 3A.

The middle rug groove 221 extends axially inwardly from the shoulder main groove 3B and terminates within the middle block 6. Such middle notch 220 and middle rug groove 221 increase the axial component and the circumferential component of the edges, and increase friction against road surface, and thereby improve running performance on icy roads. The middle notch 220 maintains the axial rigidity of the middle block 6. The middle notch 220 and the middle rug groove 221 drain water existing between the middle block 6 and the road surface smoothly to the crown main groove 3A and the shoulder main groove 3B.

The middle notch 220 is formed within the length of the short groove segment 8b where the resistance to drainage becomes relatively large. Therefore, the resistance to drainage of the crown main groove 3A and the resistance to drainage of the shoulder main groove 3B are reduced, and the drainage can be improved.

In this example, the opening edge 220c of the middle notch 220 extends over the entire length of the short middle block edge segment 19A. Thereby, water in the middle notches 220 is smoothly led into the long groove segments 8a though the short groove segments 8b. Thus, the drainage can be further improved. The opening edge 220c of the middle notch 220 faces the crown main groove 3A and forms a step to the crown main groove 3A.

The middle notch 220 has an edge 220a smoothly continued from the long middle block edge segment 19B. Such edge 220a mitigates stress concentration on the intersection between the long middle block edge segment 19B and the short middle block edge segment 19A, and increases the rigidity at the intersection. Water in the middle notch 220 is smoothly lead to the crown main groove 3A.

In this example, the edge 220a and the long middle block edge segment 19B are formed in line.

The middle rug groove 221 has an axially-extending edge 221a extending axially inwardly from the shoulder main groove 3B in parallel with the tire axial direction, and an oblique edge 221b extending axially inwardly from the shoulder main groove 3B while inclining towards the axially-extending edge 221a. Such middle rug groove 221 increases the axial component of the edges, while maintaining the circumferential component of the edges. Thereby, running performance on icy roads is further improved.

If the maximum axial length L25 of the middle notch 220 is large, there is a possibility that the rigidity of the middle block 6 becomes low, and the uneven wear resistance is deteriorated. If the maximum axial length L25 is small, the edge of the middle notch 220 becomes decreased.

Therefore, the maximum axial length L25 of the middle notch 220 is preferably not less than 15%, more preferably not less than 16%, but not more than 25%, more preferably not more than 24% of the maximum axial length wm of the middle block 6.

For similar reasons, the maximum axial length L26 of the middle rug groove 221 is preferably not less than 25%, more preferably not less than 27%, but not more than 35%, more preferably not more than 33% of the maximum axial length wm of the middle block 6.

As shown in FIG. 5, the depth D7 of the middle notch 220 is preferably not less than 55%, more preferably not less than 57%, but not more than 65%, more preferably not more than 63% of the depth D1 of the crown main groove 3A.

If the depth D7 of the middle notch 220 is large, there is a possibility that the rigidity of the middle block 6 becomes low, and the uneven wear resistance is deteriorated.

If the depth D7 is small, there is a possibility that drainage can not be improved.

For similar reasons, the depth D8 of the middle rug groove 221 is preferably not less than 55%, more preferably not less than 57%, but not more than 65%, more preferably not more than 63% of the depth D2 of the shoulder main groove 3B.

If the circumferential length L27 of the opening edge 20c of the middle notch 220 is large, there is a possibility that the rigidity of the middle block 6 becomes low, and uneven wear resistance is decreased. If the circumferential length L27 is small, there is a possibility that the drainage is decreased.

Therefore, it is not essential but preferable that, the circumferential length L27 of the opening edge 20c is not less than 12%, more preferably not less than 13%, but not more than 20%, more preferably not more than 19% of one pitch P23 of the middle block row 6R.

For similar reasons, the average circumferential length L28 of the middle rug groove 221 is preferably not less than 7%, more preferably not less than 8%, but not more than 13%, more preferably not more than 12% of one pitch P23 of the middle block row 6R.

The shoulder block 7 is crossed by a shoulder narrow groove 223 extending straight continuously in the tire circumferential direction. Thereby, the shoulder block 7 is divided into an inside block 7A axially inside the shoulder narrow groove 223 and an outside block 7B axially outside the inside block 7A. Such shoulder narrow groove 223 brings out a large edge effect in the tire axial direction and improves cornering performance.

If the width W6 of the shoulder narrow groove 223 is large, there is a possibility that the axial rigidity of the inside block 7A or outside block 7B becomes low, and uneven wear resistance is deteriorated. If the width W6 of the shoulder narrow groove 223 is small, there is a possibility that drainage becomes decreased.

Therefore, the width W6 of the shoulder narrow groove 223 is preferably not less than 0.5 mm, more preferably not less than 1.0 mm, but not more than 2.0 mm, more preferably not more than 1.5 mm.

For similar reasons, the depth D9 of the shoulder narrow groove 223 is preferably not less than 5.0 mm, more preferably not less than 5.5 mm, but preferably not more than 8.0 mm, more preferably not more than 7.5 mm.

The axially outer end of the oblique portion 13a is connected to the shoulder narrow groove 223.

The central land portion 5, the middle blocks 6, the inside blocks 7A and the outside blocks 7B are each provided with axially extending sipes 225. Such sipes 225 increase the axial edge component and improve running performance on icy roads.

In this example, the sipes 225 include a semi-open sipe 225a having an end opened to the main groove 3A,3B or shoulder narrow groove 223 and an end terminating within the central land portion 5 or the block 6,7A.7B, and an open sipe 225b having both ends opened to the crown main grooves 3A.

The open sipes 225b are disposed in only the central land portion 5 where the ground pressure is relatively high during straight running. Therefore, the drive power and braking force during straight running is increased, and the straight running stability on icy roads can be improved.

In this embodiment, the sipes 225 are straight sipes, therefore the axial edge component is increased and running performance on icy roads can be further improved. The sipes 225 are not limited to such configuration. Various configurations, e.g. wavy configuration may be employed.

The angles $\alpha 2s$ of the sipes 225 with respect to the tire axial direction are preferably set in a range of from 0 to 30 degrees in order to maintain the improved drive power and braking force.

The sipes 225 provided in the central land portion 5 are not connected to the central notches 215, therefore, the rigidity of the central land portion 5 is maintained, and uneven wear resistance is improved.

The central land portion 5 and the blocks 6, 7A and 7B are each provided with cross sipes 226 crossing the sipes 225 orthogonally thereto and having lengths less than those of the sipes 225. Such cross sipes 226 increase the circumferential edge component and improve the cornering performance.

In this example, in order to uniform the rigidity of each of the central land portion 5 and the blocks 6, 7A and 7B in the tire axial direction,
in an axially outside region So of each of the central land portion 5 and the blocks 6, 7A and 7B, one cross sipe 226 is formed, and
in an axially inside region Si two cross sipes 226 are formed.

For example, in the case of the central land portion 5, the inside region Si is, as shown in FIG. 7, a region extending 25% of the maximum length we of the central land portion 5 from the axial midpoint Cp of the central land portion 5 toward each side thereof in the tire axial direction, and the outside region So is therefore, a region formed on each side of the inside region Si. For each of the middle block 6, the inside block 7A and the outside block 7B, the inside region Si and the outside region So are defined as a central 50% region and a lateral 25% region in the same manner as above.

It is not essential but preferable that the pitch Pa between the two cross sipes 226 provided with in the inside region Si is set in a range of from 4% to 8% of the maximum axial width of the central land portion 5 or block 6,7A,7B provided with the two cross sipes 226 in order to effectively derive the above advantageous effect.

Preferably, the land ratio, namely, the ratio of the ground contacting area of the tread portion 2 to the overall area of the tread portion 2, is set in a range of from 68% to 72% in order to improve running performance on icy roads, uneven wear resistance and drainage in a well balanced manner.

FIG. 9 shows a modification of the above described second embodiment, wherein the central land portion 5, the middle blocks 6 and shoulder block 7 are each provided with zigzag sipes 227 instead of the linear sipes 225 and 226. such sipes increase the circumferential edge component and the axial edge component and improve running performance on snowy roads.

Comparison Tests

Pneumatic tires having tread patterns based on FIG. 6 and specifications shown in Table 3, and pneumatic tires having tread patterns based on FIG. 9 and specifications shown in Table 4 were prepared and tested for the drainage, running performance on icy roads and uneven wear resistance.

Common specifications are as follows:
tire size: 195/80R15 (rim size: 15×6.0J)
tread width Tw: 160 mm
main groove depth D1: 12.5 mm
main groove depth D2: 12.5 mm
middle axial groove depth D3: 9.0 mm
oblique portion's groove depth D4: 7.0 mm
axially-extending portion's groove depth D5: 10.5 mm
shoulder narrow groove depth D9: 7.0 mm
middle axial groove depth D3: 9.0 mm
oblique portion's groove depth D4: 7.0 mm
axially-extending portion's groove depth D5: 10.5 mm
shoulder narrow groove depth D9: 7.0 mm
sipes' depth: 7.0 mm
cross sipes' depth: 2.0 mm <Drainage>

The test tires were mounted on the four wheels of a test car (2700 cc 4WD passenger car).
Tire pressure: 350 kPa (front), 425 kPa (rear)
The test car was run on the asphalt road in the tire test course covered with 2 to 5 mm depth of water, and the test driver evaluated running characteristics about the steering response, rigid feeling, grip and the like.
The results are indicated in Tables 3 and 4 by an index based on Ex. 1 and Ex. 1R being 100, wherein the larger the value, the better the performance (under 95 is not acceptable).

<Running Performance on Icy Roads>

The above-mentioned test car was run on an icy road in the tire test course, and the test driver evaluated running characteristics about the steering response, rigid feeling, grip and the like.
The results are indicated in Tables 3 and 4 by an index based on Ex. 1 and Ex. 1R being 100, wherein the larger the value, the better the performance (under 95 is not acceptable).

<Uneven Wear Resistance>

The above-mentioned test car was run on a dry asphalt road for 10000 km. Then, there were measured at eight circumferential positions around the tire, the amount of wear of the central land portion at its both edges, and the amount of wear of the middle block at its both edges to obtain the difference between the maximum and the minimum of the amount of wear.
The results are indicated in Tables 3 and 4 by an index based on Ex. 1 and Ex. 1R being 100, wherein the larger the value, the better the performance (under 95 is not acceptable).
From the test results, it was confirmed that, in comparison with comparative tires, Embodiment tires were significantly improved in the drainage, running performance on icy roads and uneven wear resistance.

TABLE 3

| Tire | Ref. 1 | Ex. 1 | Ref. 2 | Ex. 2 | Ex. 3 | Ref. 3 | Ref. 4 | Ex. 4 | Ex. 5 | Ref. 5 | Ex. 6 | Ex. 7 | Ex. 8 |
|---|---|---|---|---|---|---|---|---|---|---|---|---|---|
| L24/P22(%) | 0 | 20 | 5 | 15 | 25 | 35 | 20 | 20 | 20 | 20 | 20 | 20 | 20 |
| D6/D1 (%) | — | 60 | 60 | 60 | 60 | 60 | 45 | 55 | 65 | 75 | 60 | 60 | 60 |
| L25/Wm (%) | — | 20 | 20 | 20 | 20 | 20 | 20 | 20 | 20 | 20 | 5 | 15 | 25 |
| D7/D1(%) | — | 60 | 60 | 60 | 60 | 60 | 60 | 60 | 60 | 60 | 60 | 60 | 60 |
| L26/Wm (%) | — | 30 | 30 | 30 | 30 | 30 | 30 | 30 | 30 | 30 | 30 | 30 | 30 |
| D8/D1 (%) | — | 60 | 60 | 60 | 60 | 60 | 60 | 60 | 60 | 60 | 60 | 60 | 60 |
| on-ice performance | 90 | 100 | 95 | 98 | 102 | 104 | 104 | 102 | 102 | 104 | 97 | 99 | 101 |
| drainage | 90 | 100 | 95 | 98 | 102 | 104 | 95 | 100 | 100 | 102 | 98 | 99 | 101 |
| wear resistance | 102 | 100 | 103 | 101 | 98 | 95 | 103 | 98 | 97 | 93 | 103 | 101 | 99 |

| Tire | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|---|
| L24/P22(%) | 20 | 20 | 20 | 20 | 20 | 20 | 20 | 20 | 20 | 20 | 20 | 20 | 20 |
| D6/D1 (%) | 60 | 60 | 60 | 60 | 60 | 60 | 60 | 60 | 60 | 60 | 60 | 60 | 60 |
| L25/Wm (%) | 35 | 20 | 20 | 20 | 20 | 20 | 20 | 20 | 20 | 20 | 20 | 20 | 20 |
| D7/D1(%) | 60 | 45 | 55 | 65 | 75 | 60 | 60 | 60 | 60 | 60 | 60 | 60 | 60 |
| L26/Wm (%) | 30 | 30 | 30 | 30 | 30 | 15 | 25 | 35 | 45 | 30 | 30 | 30 | 30 |
| D8/D1 (%) | 60 | 60 | 60 | 60 | 60 | 60 | 60 | 60 | 60 | 45 | 55 | 65 | 75 |
| on-ice performance | 103 | 100 | 100 | 100 | 100 | 97 | 99 | 101 | 103 | 100 | 100 | 100 | 100 |
| drainage | 102 | 97 | 99 | 101 | 103 | 98 | 99 | 101 | 102 | 97 | 99 | 101 | 103 |
| wear resistance | 97 | 103 | 101 | 99 | 97 | 103 | 101 | 99 | 97 | 103 | 101 | 99 | 97 |

TABLE 4

| Tire | Ref. 1R | Ex. 1R | Ref. 2R | Ex. 2R | Ex. 3R | Ref. 3R | Ref. 4R | Ex. 4R | Ex. 5R | Ref. 5R | Ex. 6R | Ex. 7R | Ex. 8R |
|---|---|---|---|---|---|---|---|---|---|---|---|---|---|
| L24/P22(%) | 0 | 20 | 5 | 15 | 25 | 35 | 20 | 20 | 20 | 20 | 20 | 20 | 20 |
| D6/D1 (%) | — | 60 | 60 | 60 | 60 | 60 | 45 | 55 | 65 | 75 | 60 | 60 | 60 |
| L25/Wm (%) | — | 20 | 20 | 20 | 20 | 20 | 20 | 20 | 20 | 20 | 5 | 15 | 25 |
| D7/D1 (%) | — | 60 | 60 | 60 | 60 | 60 | 60 | 60 | 60 | 60 | 60 | 60 | 60 |
| L26/Wm (%) | — | 30 | 30 | 30 | 30 | 30 | 30 | 30 | 30 | 30 | 30 | 30 | 30 |
| D8/D1 (%) | — | 60 | 60 | 60 | 60 | 60 | 60 | 60 | 60 | 60 | 60 | 60 | 60 |
| running performance on icy roads | 90 | 100 | 94 | 98 | 102 | 104 | 104 | 101 | 103 | 105 | 97 | 98 | 102 |
| drainage | 89 | 100 | 95 | 99 | 101 | 103 | 95 | 100 | 100 | 103 | 98 | 99 | 101 |
| wear resistance | 101 | 100 | 102 | 101 | 98 | 95 | 102 | 99 | 97 | 92 | 104 | 102 | 98 |

TABLE 4-continued

| Tire | Ex. 9R | Ex. 10R | Ex. 11R | Ex. 12R | Ex. 13R | Ex. 14R | Ex. 15R | Ex. 16R | Ex. 17R | Ex. 18R | Ex. 19R | Ex. 20R | Ex. 21R |
|---|---|---|---|---|---|---|---|---|---|---|---|---|---|
| L24/P22(%) | 20 | 20 | 20 | 20 | 20 | 20 | 20 | 20 | 20 | 20 | 20 | 20 | 20 |
| D6/D1 (%) | 60 | 60 | 60 | 60 | 60 | 60 | 60 | 60 | 60 | 60 | 60 | 60 | 60 |
| L25/Wm (%) | 35 | 20 | 20 | 20 | 20 | 20 | 20 | 20 | 20 | 20 | 20 | 20 | 20 |
| D7/D1 (%) | 60 | 45 | 55 | 65 | 75 | 60 | 60 | 60 | 60 | 60 | 60 | 60 | 60 |
| L26/Wm (%) | 30 | 30 | 30 | 30 | 30 | 15 | 25 | 35 | 45 | 30 | 30 | 30 | 30 |
| D8/D1 (%) | 60 | 60 | 60 | 60 | 60 | 60 | 60 | 60 | 60 | 45 | 55 | 65 | 75 |
| running performance on icy roads | 104 | 100 | 100 | 100 | 100 | 98 | 99 | 101 | 102 | 100 | 100 | 100 | 100 |
| drainage | 102 | 98 | 98 | 101 | 102 | 99 | 98 | 101 | 102 | 97 | 99 | 101 | 103 |
| wear resistance | 96 | 102 | 101 | 98 | 97 | 103 | 102 | 98 | 97 | 102 | 101 | 99 | 97 |

The invention claimed is:

1. A pneumatic tire comprising a tread portion provided with
a crown main groove extending continuously in the tire circumferential direction and disposed on each side the tire equator,
a shoulder main groove extending continuously in the tire circumferential direction and disposed axially outside each said crown main groove,
a plurality of middle axial grooves extending between said crown main groove and said shoulder main groove, and
a plurality of shoulder axial grooves extending between said shoulder main groove and the adjacent tread edge so that the tread portion is divided into
a row of circumferentially arranged shoulder blocks formed between said shoulder main groove and said tread edge,
a single row of circumferentially arranged middle blocks formed between said crown main groove and said shoulder main groove, and
a single central land portion formed between the two crown main grooves and disposed on the tire equator,
wherein
the central land portion is provided with central notches extending from the two crown main grooves toward the tire equator, and terminating within the central land portion so that the central land portion extends continuously in the tire circumferential direction, wherein
the depth of each said central notch is in a range of from 55% to 65% of the depth of the adjacent crown main groove,
said central notches satisfy the following condition:
the maximum axial length of each said central notch is 10% to 15% of the maximum axial length of the central land portion, and the circumferential length of an opening of each said central notch to the crown main groove is 10% to 15% of one pitch of the shoulder blocks in said row of shoulder blocks,
each said crown main groove is a zigzag groove composed of alternate long groove segments and short groove segments,
each said shoulder main groove is a zigzag groove composed of alternate long groove segments and short groove segments, and
each said middle block is provided with notches which are
an axially inside notch formed adjacently to the crown main groove so as to include one of intersections between the long groove segments and the short groove segments of the crown main groove, and
an axially outside notch formed adjacently to the shoulder main groove so as to include one of intersections between the long groove segments and the short groove segments of the shoulder main groove.

2. The pneumatic tire according to claim 1, wherein each said central notch has, in its top view, a polygonal shape defined by four or more sides.

3. The pneumatic tire according to claim 2, wherein each said central notch is formed so as to include one of intersections between the long groove segments and the short groove segments of the adjacent crown main groove.

4. The pneumatic tire according to claim 2 wherein the ratio of the ground contacting area of the tread portion to the overall area of the tread portion is 68% to 72%.

5. The pneumatic tire according to claim 1, wherein each said central notch is formed so as to include one of intersections between the long groove segments and the short groove segments of the adjacent crown main groove.

6. The pneumatic tire according to claim 5, wherein
the central land portion has an edge being adjacent to each of the crown main grooves and comprising long central edge segments extending along the long groove segments of the crown main groove and short central edge segments extending between the long central edge segments,
the middle blocks have axially inner middle block edges being adjacent to the respective crown main grooves and comprising short middle block edge segments and long middle block edge segments between the short middle block edge segments,
the short middle block edge segments are inclined with respect to the tire circumferential direction in one direction,
the long middle block edge segments are inclined with respect to the tire circumferential direction in one direction opposite to that of the short middle block edge segments, and have a circumferential length longer than the circumferential length of the short middle block edge segments,
on both sides of each of the crown main grooves, the short central edge segments are overlapped with the short middle block edge segments in the tire circumferential direction, and
an arrangement pitch of the short central edge segments is the same as an arrangement pitch of the short middle block edge segments.

7. The pneumatic tire according to claim 5, wherein the ratio of the ground contacting area of the tread portion to the overall area of the tread portion is 68% to 72%.

8. The pneumatic tire according to claim 1, wherein the ratio of the ground contacting area of the tread portion to the overall area of the tread portion is 68% to 72%.

9. The pneumatic tire according to claim 8, wherein
the central land portion has an edge being adjacent to each of the crown main grooves and comprising long central edge segments extending along the long groove segments of the crown main groove and short central edge segments extending between the long central edge segments,
the middle blocks have axially inner middle block edges being adjacent to the respective crown main grooves and comprising short middle block edge segments and long middle block edge segments between the short middle block edge segments,
the short middle block edge segments are inclined with respect to the tire circumferential direction in one direction,
the long middle block edge segments are inclined with respect to the tire circumferential direction in one direction opposite to that of the short middle block edge segments, and have a circumferential length longer than the circumferential length of the short middle block edge segments,
on both sides of each of the crown main grooves, the short central edge segments are overlapped with the short middle block edge segments in the tire circumferential direction, and
an arrangement pitch of the short central edge segments is the same as an arrangement pitch of the short middle block edge segments.

10. The pneumatic tire according to claim 1, wherein the shoulder blocks in said row have axially inner edges comprising:
a plurality of long shoulder block edges inclining with respect to the tire circumferential direction in one direction, and
a plurality of short shoulder block edges which are opening edges of the shoulder axial grooves between the long shoulder block edges.

11. A pneumatic tire comprising a tread portion provided with
a crown main groove extending continuously in the tire circumferential direction and disposed on each side the tire equator,
a shoulder main groove extending continuously in the tire circumferential direction and disposed axially outside each said crown main groove,
a plurality of middle axial grooves extending between said crown main groove and said shoulder main groove, and
a plurality of shoulder axial grooves extending between said shoulder main groove and the adjacent tread edge
so that the tread portion is divided into
a row of circumferentially arranged shoulder blocks formed between said shoulder main groove and said tread edge,
a single row of circumferentially arranged middle blocks formed between said crown main groove and said shoulder main groove, and
a single central land portion formed between the two crown main grooves and disposed on the tire equator,
wherein
the central land portion is provided with central notches extending from the two crown main grooves toward the tire equator, and terminating within the central land portion so that the central land portion extends continuously in the tire circumferential direction,
wherein
the depth of each said central notch is in a range of from 55% to 65% of the depth of the adjacent crown main groove,
said central notches satisfy the following condition:
the circumferential length of an opening of each said central notch to the crown main groove is 15% to 25% of one pitch of the central notches,
each said crown main groove is a zigzag groove composed of alternate long groove segments and short groove segments,
each said shoulder main groove is a straight groove, and
each said middle block is provided with
an axially inside notch formed adjacently to the crown main groove so as to include one of intersections between the long groove segments and the short groove segments of the crown main groove, and
a middle lug groove extending axially inwardly from the adjacent shoulder main groove and terminating within the middle block so as to be located between the two adjacent middle axial grooves in the tire circumferential direction,
wherein
the maximum axial length of the middle lug groove is in a range of from 25% to 35% of the maximum axial length of the middle block, and
the depth of the middle lug groove is in a range of from 55% to 65% of the depth of the crown main groove.

12. The pneumatic tire of claim 11, wherein
the axially inside notch of each said middle extends axially outwardly from the crown main groove, and terminates within the middle block,
the notch has a maximum axial length of 15% to 25% of the maximum axial length of the middle block, and
a depth of 55% to 65% of the depth of the crown main groove.

13. The pneumatic tire according to claim 11, wherein the land ratio of the ground contacting area of the tread portion to the overall area of the tread portion is 68% to 72%.

* * * * *